(12) United States Patent
Utsuno

(10) Patent No.: US 8,368,572 B2
(45) Date of Patent: Feb. 5, 2013

(54) DETECTING DEVICE

(75) Inventor: Kikuo Utsuno, Miyazaki (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 84 days.

(21) Appl. No.: 13/114,129

(22) Filed: May 24, 2011

(65) Prior Publication Data

US 2011/0291869 A1 Dec. 1, 2011

(30) Foreign Application Priority Data

May 27, 2010 (JP) ................................. 2010-122010

(51) Int. Cl.
*H03M 1/00* (2006.01)

(52) U.S. Cl. ........ 341/132; 341/118; 341/119; 341/139; 341/142

(58) Field of Classification Search .................. 341/118, 341/119, 120, 121, 132, 139, 142, 155
See application file for complete search history.

(56) References Cited

U.S. PATENT DOCUMENTS

| | | | | |
|---|---|---|---|---|
| 3,978,471 | A * | 8/1976 | Kelly | 341/118 |
| 5,448,369 | A * | 9/1995 | Lee et al. | 386/230 |
| 5,828,329 | A * | 10/1998 | Burns | 341/155 |
| 6,158,887 | A * | 12/2000 | Simpson | 374/183 |
| 6,933,867 | B2 * | 8/2005 | Honda | 341/118 |
| 6,972,703 | B1 * | 12/2005 | Yen et al. | 341/136 |
| 7,460,973 | B2 * | 12/2008 | Kobayashi et al. | 702/133 |
| 8,009,078 | B1 * | 8/2011 | Alley | 341/155 |
| 8,274,421 | B2 * | 9/2012 | Rey-Losada | 341/163 |
| 2003/0213910 | A1 * | 11/2003 | Anderson et al. | 250/338.1 |
| 2008/0054163 | A1 * | 3/2008 | Suzunaga | 250/214 A |
| 2009/0201067 | A1 * | 8/2009 | Haneda | 327/306 |
| 2009/0322579 | A1 * | 12/2009 | Matsuda | 341/158 |

FOREIGN PATENT DOCUMENTS

| | | |
|---|---|---|
| JP | 3-39129 | 4/1991 |
| JP | 07-055588 | 3/1995 |
| JP | 2001-201404 | 7/2001 |
| JP | 2002-310807 | 10/2002 |

* cited by examiner

*Primary Examiner* — Linh Nguyen
(74) *Attorney, Agent, or Firm* — Volentine & Whitt, PLLC

(57) ABSTRACT

A detecting device has: a detecting element to which a first constant voltage is applied; a resistance element connected to the detecting element; a switching element having a first terminal to the resistance element, a second terminal controlled to a second constant voltage lower than the first constant voltage, and a control terminal sets the first terminal and the second terminal in a conducting state; a control unit, according to a conducting/non-conducting state, controls voltage to the control terminal to maintain a potential difference between the detecting element and the resistance element; and an AD converter converting, into a digital value, a potential of a potential difference between the first constant voltage and the first terminal being voltage-divided at the detecting element and the resistance element to the detecting element, a first reference potential is the first constant voltage, and a second reference potential is voltage to the first terminal.

10 Claims, 10 Drawing Sheets

DETECTING DEVICE

CROSS-REFERENCE TO RELATED APPLICATIONS

This application claims priority under 35 USC 119 from Japanese Patent Application No. 2010-122010 filed on May 27, 2010, the disclosure of which is incorporated by reference herein.

BACKGROUND OF THE INVENTION

1. Field of the Invention

The present invention relates to a detecting device, and in particular, to a detecting device that detects a physical amount by using change in an electrical resistance value.

2. Description of the Related Art

There is a technique of detecting a physical amount by using a resistor (hereinafter called "thermistor") whose electrical resistance value varies with respect to change in temperature. For example, when detecting temperature by using an NTC thermistor, as shown in FIG. 6 as an example, the electrical resistance value decreases with respect to rise in temperature, but the changes in the electrical resistance value with respect to temperature are not linear. Even when a thermistor other than an NTC thermistor is used (e.g., a PTC thermistor or a CTR thermistor), the changes in the electrical resistance value with respect to temperature still are not linear. Therefore, generally, a thermistor is connected in series to a voltage divider resistor whose electrical resistance value is 3.9 kΩ as shown as an example in FIG. 7, and due thereto, the changes in the electrical resistance value can be made to be linear by using the voltage division output such as shown as an example in FIG. 8.

However, at a thermistor, the changes in the electrical resistance value with respect to temperature are great, and therefore, even if the changes in the electrical resistance value are linearized by structuring a circuit such as shown in FIG. 7, the temperature range at which linearity is obtained is limited. In order to detect temperatures of a wide range, the voltage division resistance value must be switched by a switch in accordance with the temperature region. A circuit structure such as shown in FIG. 9 for example can be given as an example of a circuit structure for detecting temperatures of a wide range. In this case, a voltage divider resistor unit 102 and a switch unit 104 are connected to a thermistor 100. The voltage divider resistor unit 102 is structured to include a voltage divider resistor 102A whose electrical resistance value is 240 kΩ, a voltage divider resistor 102B whose electrical resistance value is 3.9 kΩ, and a voltage divider resistor 102C whose electrical resistance value is 0.36 kΩ. The switch unit 104 is structured to include switches 104A, 104B, 104C. In the circuit shown in FIG. 9, the other end of the thermistor 100, to whose one end power source voltage VDD is applied, is connected to respective one ends of the voltage divider resistor 102A that corresponds to low temperature region $T_L$ (e.g., $-30°$ C.$<T_L \leq 75°$ C.), the voltage divider resistor 102B that corresponds to medium temperature region $T_M$ (e.g., $75°$ C.$<T_M \leq 180°$ C.), and the voltage divider resistor 102C that corresponds to high temperature region $T_H$ (e.g., $180°$ C.$<T_H \leq 350°$ C.). (Hereinafter, when there is no need to differentiate among the voltage divider resistors 102A, 102B, 102C, they are called the "voltage divider resistors 102".) Further, the other end of the switch 104A, whose one end is grounded, is connected to the other end of the voltage divider resistor 102A, and the other end of the switch 104B, whose one end is grounded, is connected to the other end of the voltage divider resistor 102B, and the other end of the switch 104C, whose one end is grounded, is connected to the other end of the voltage divider resistor 102C. Moreover, among the switches 104A, 104B, 104C (hereinafter called the "switches 104" when there is no need to differentiate thereamong), by turning on only the switch 104 that corresponds to the temperature range to be detected, linearization of the electrical resistance values can be aimed for at each of the temperature regions that are the low temperature region $T_L$, the medium temperature region $T_M$ and the high temperature region $T_H$, as shown in FIG. 10 as an example.

The techniques disclosed in Japanese Patent Application Laid-Open (JP-A) No. 2001-201404, JP-A No. 7-55588, Japanese Utility Model Application Laid-Open (JP-U) No. 3-39129, and JP-A No. 2002-310807 for example are other techniques for aiming to linearize the electrical resistance values of a thermistor. All of these techniques as well vary the electrical resistance value of the thermistor per temperature region.

JP-A No. 2001-201404 discloses a technique of switching the current value that is supplied to a thermistor, for each of plural temperature regions detected at the thermistor.

Further, JP-A No. 7-55588 discloses the following technique: in a temperature detecting device that detects temperature by using an element whose electrical resistance value varies due to temperature, by switching switches on and off, selecting any of plural resistors that are respectively connected in series to the element per temperature region and that are connected to one another in parallel, and supplying current to the selected resistor.

JP-U No. 3-39129 discloses a temperature detecting circuit that uses the voltage division value of a temperature sensor and a pull-up resistor as sensor output, and that has a switching element that selectively switches plural pull-up resistors having different electrical resistance values, with respect to the temperature sensor.

JP-A No. 2002-310807 discloses a temperature detecting device having a switch for switching plural pull-up resistors that are connected between an electric circuit and a thermistor, and that have respectively different electrical resistance values, and that pull-up the output of the thermistor.

However, in the circuit structure shown in FIG. 9, the electrical resistance values of the switches 104 are added to the voltage division resistance values. Therefore, when the thermistor 100 and the voltage divider resistors 102 become several hundred Ω due to temperature, the electrical resistance values of the switches 104 cannot be ignored, and detection errors arise.

Further, a method has been thought of, in order to make the effect of the electric resistance values of the switches 104 small, using field effect transistors (FETs) for example as the switches 104, and lowering the electrical resistance values by widening the gate widths thereof. However, the constructed surface area increases.

Moreover, a method has been thought of measuring the voltage division output and the drops in the voltages of the switches 104, and calculating and eliminating the voltage errors due to the switches 104. However, means for computing is needed which leads to an increase in size of the form and an increase in costs. Further, because a large zero scale vicinity of the AD conversion error is AD-converted, it is difficult to decrease the detection errors.

Still further, none of the techniques disclosed in aforementioned JP-A No. 2001-201404, JP-A No. 7-55588, JP-U No. 3-39129, and JP-A No. 2002-310807 can suppress detection errors due to the electrical resistance values of the switching elements.

Note that cases of detecting physical amounts other than temperature (e.g., the electrostatic capacity of a capacitor, the amount of strain of a physical object, or the like) by using the electrical resistance value of a resistance element are similar to cases of detecting temperature.

SUMMARY OF THE INVENTION

The present invention has been made in view of the above circumstances and provides a detecting device.

According to an aspect of the invention, there is provided a detecting device including: a detecting element to one end of which a first constant voltage is applied, and an electrical resistance value of which varies in accordance with changes in a physical amount serving as an object of detection; a resistance element having one end connected to another end of the detecting element; a switching element having a first terminal connected to another end of the resistance element, a second terminal controlled to a second constant voltage that is a lower voltage than the first constant voltage, and a control terminal that, when a voltage that is greater than or equal to a predetermined magnitude is applied, sets the first terminal and the second terminal, which are typically in a non-conducting state, in a conducting state; a control unit which, in accordance with a conducting/non-conducting state between the first terminal and the second terminal, controls a voltage applied to the control terminal such that a potential difference between the one end of the detecting element and the other end of the resistance element is maintained at a predetermined potential difference; and an AD converter that converts, into a digital value, a potential obtained by a potential difference between the first constant voltage and the first terminal being voltage-divided at the detecting element and the resistance element that is connected to the other end of the detecting element, and at which a first reference potential is the first constant voltage and a second reference potential is a voltage applied to the first terminal.

BRIEF DESCRIPTION OF THE DRAWINGS

Preferred embodiments of the present invention will be described in detail based on the following figures, wherein.

DETAILED DESCRIPTION OF THE INVENTION

Examples of forms for embodying the present invention are described in detail hereinafter with reference to the drawings. Note that the following describes cases in which the present invention is applied to a temperature detecting device.

First Exemplary Embodiment

Figure 1:
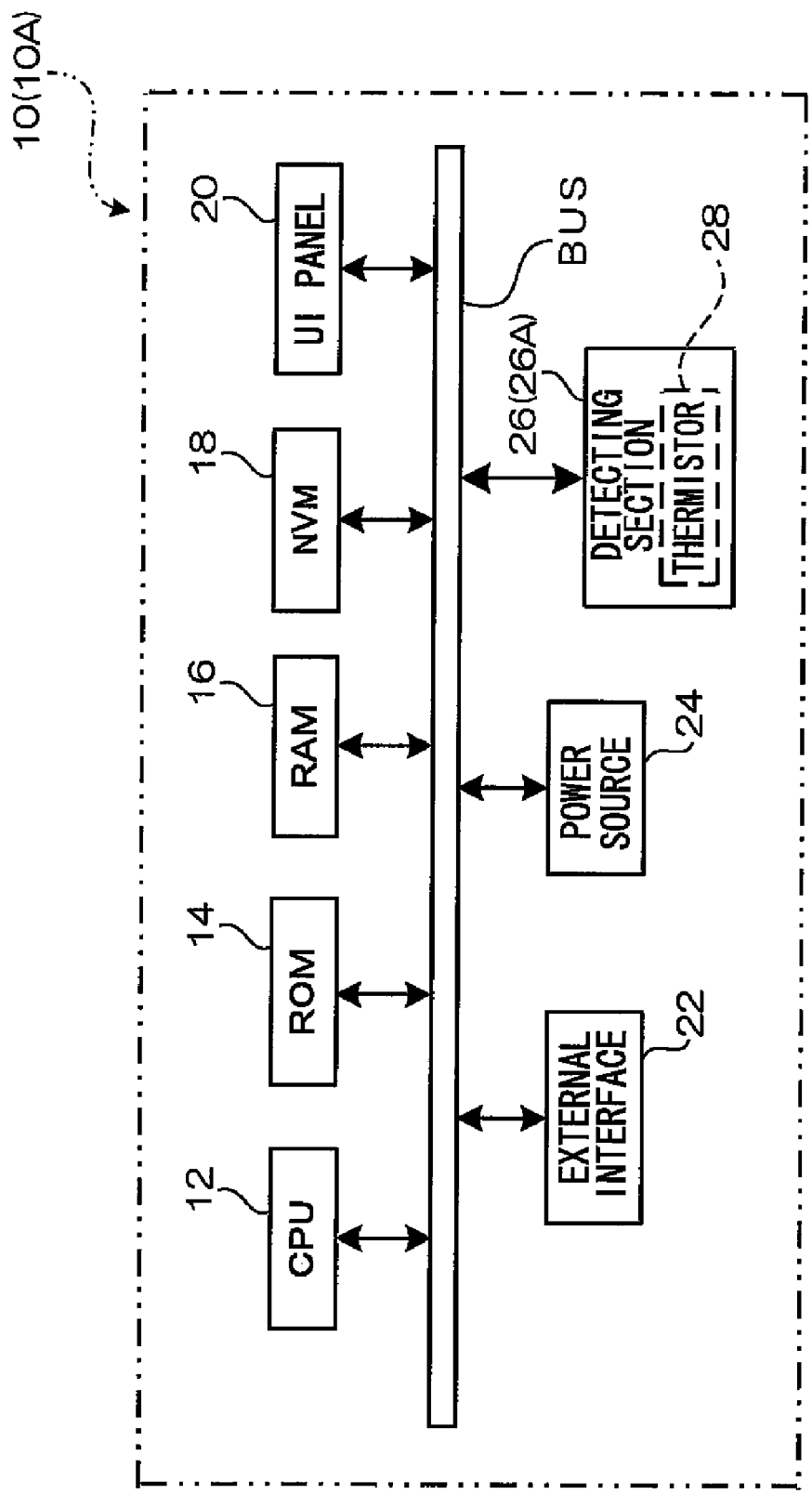
FIG. 1 is a block diagram showing an example of the structure of a temperature detecting device relating to first and second exemplary embodiments.

FIG. 1 is a structural drawing showing an example of the structure of a temperature detecting device 10 relating to the present first exemplary embodiment. As shown in FIG. 1, the temperature detecting device 10 is structured to include a CPU (Central Processing Unit) 12, a ROM (Read Only Memory) 14, a RAM (Random Access Memory) 16, an NVM (Non Volatile Memory) 18, a UI (User Interface) panel 20, an external interface 22, a power source 24 and a detecting section 26.

The CPU 12 governs the operations of the temperature detecting device 10 overall. The ROM 14 functions as a storage unit that stores, in advance, various types of programs such as control programs for controlling the operations of the temperature detecting device 10, a temperature detection processing program that is described below, and the like, and various types of parameters, and the like. The RAM 16 is used as a work area at the time of executing various types of programs, or the like. The NVM 18 stores various types of information that must be stored even if a power source switch (not shown) of the temperature detecting device 10 is turned off.

The UI panel 20 is structured from a touch panel display at which a transmissive touch panel is superposed on a display, or the like. At the UI panel 20, various types of information are displayed on the display surface of the display, and desired information and instructions are inputted by a user touching the touch panel.

The external interface 22 is connected to an external device (not shown) such as a personal computer or the like, and is for carrying out transmission and reception of various types of information to and from the external device.

The power source 24 supplies voltage for driving to the electronic equipment that structure the temperature detecting device 10, i.e., the CPU 12, the ROM 14, the RAM 16, the NVM 18, the UI panel 20, the external interface 22 and the detecting section 26. In the temperature detecting device 10 relating to the present first exemplary embodiment, a secondary battery is used as the power source 24, and a lithium ion battery, a lithium ion polymer secondary battery, a nickel hydrogen battery, and the like can be given as examples.

The CPU 12, the ROM 14, the RAM 16, the NVM 18, the UI panel 20, the external interface 22 and the power source 24 are connected to one another via a system bus BUS. Accordingly, the CPU 12 can respectively carry out access to the ROM 14, the RAM 16 and the NVM 18, display of various types of information onto the UI panel 20, grasping the contents of operations/instructions of the user with respect to the UI panel 20, reception of various types of information from the external device via the external interface 22, transmission of various types of information to the external device via the external interface 22, and control of the power source 24.

The detecting section 26 detects temperature by using a thermistor 28, and is connected to the system bus BUS.

Accordingly, the CPU 12 can control the operation of the detecting section 26 and can grasp the temperature detected by the detecting section 26.

Figure 2:
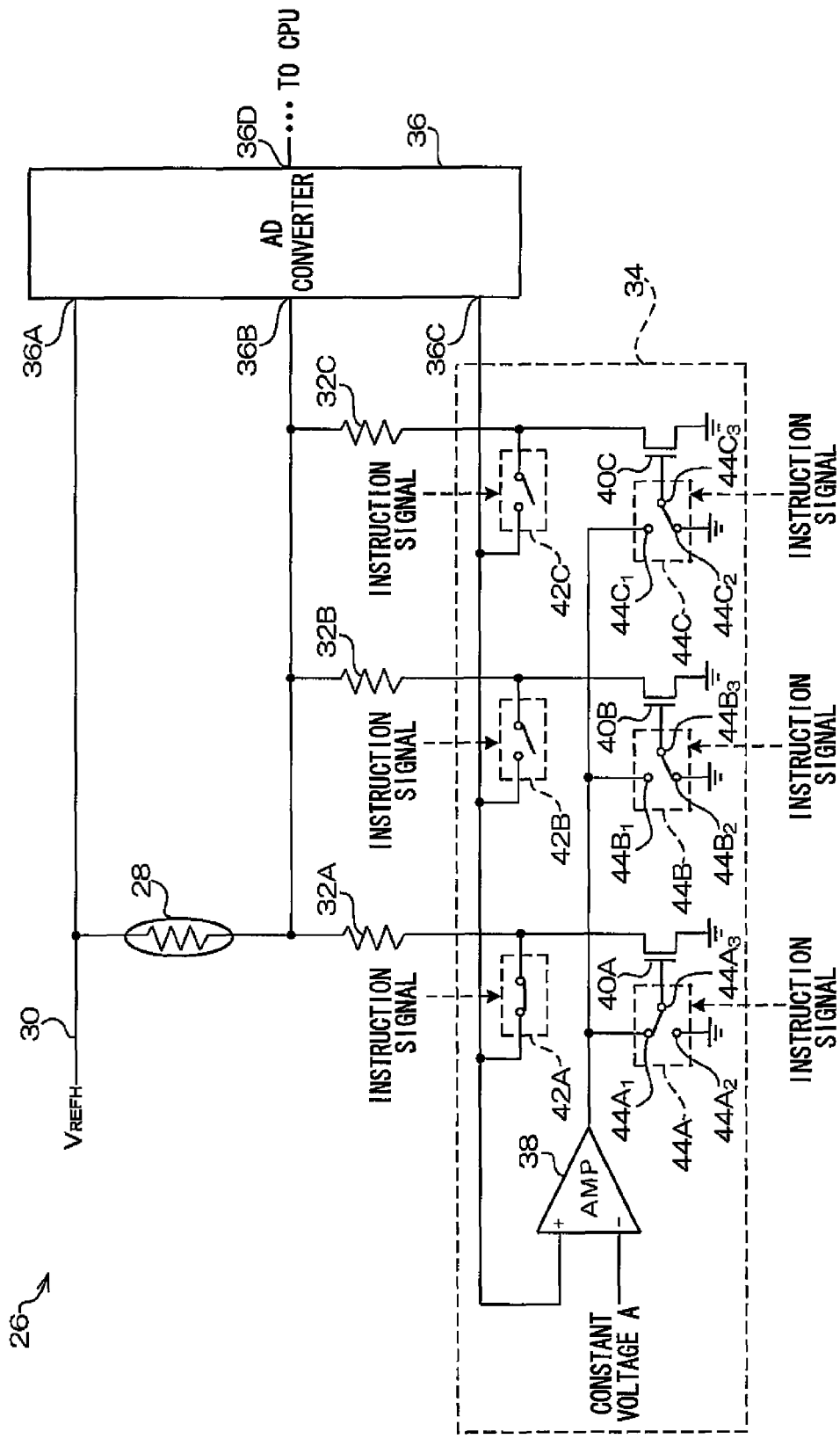
FIG. 2 is a structural drawing showing an example of the structure of a detecting section relating to the first exemplary embodiment.

FIG. 2 is a structural drawing showing an example of the structure of the detecting section 26 relating to the present first exemplary embodiment. As shown in FIG. 2, the detecting section 26 is structured to include thermistor 28, a power source line 30, voltage divider resistors 32A, 32B, 32C (hereinafter called "voltage divider resistors 32", without the final letter appended thereto, when there is no need to differentiate therebetween), a voltage divider resistor switching circuit 34, and an AD converter 36. Note that, in the temperature detecting device 10 relating to the present first exemplary embodiment, as an example, 240 kΩ is used as the electrical resistance value of the voltage divider resistor 32A, 3.9 kΩ is used as the electrical resistance value of the voltage divider resistor 32B, and 0.36 kΩ is used as the electrical resistance value of the voltage divider resistor 32C.

The AD converter 36 has first through third input terminals 36A, 36B, 36C. Further, the AD converter 36 has an output terminal 36D that is connected to the system bus BUS. The AD converter 36 converts analog signals, that are inputted to the first through third input terminals 36A, 36B, 36C, into digital signals, and outputs the digital signals from the output terminal 36D to the CPU 12.

The power source line 30 is connected to the first input terminal 36A for prescribing the free scale of the AD converter 36, and constant voltage $V_{REFH}$ (here, 2 V as an example) is applied thereto by the power source 24. Further, the thermistor 28 is a resistance element whose electrical resistance value varies in accordance with changes in temperature, and one end of the thermistor 28 is connected to the power source line 30. Moreover, respective one ends of the voltage divider resistors 32A, 32B, 32C are connected to the other end of the thermistor 28 and to the second input terminal 36B for prescribing the zero scale of the AD converter 36. Note that, in the temperature detecting device 10 relating to the present first exemplary embodiment, an NTC thermistor is used as the thermistor 28.

The voltage divider resistor switching circuit 34 is structured to include a differential amplification circuit 38, N-channel-type MOS field effect transistors (hereinafter called "NMOS transistors) 40A, 40B, 40C, single pole single throw switches 42A, 42B, 42C, and single pole double throw switches 44A, 44B, 44C. Note that, hereinafter, when there is no need to differentiate among the NMOS transistors 40A, 40B, 40C, they are called the "NMOS transistors 40" without the final letter appended thereto. When there is no need to differentiate among the switches 42A, 42B, 42C, they are called the "switches 42" without the final letter appended thereto. When there is no need to differentiate among the switches 44A, 44B, 44C, they are called the "switches 44" without the final letter appended thereto.

The differential amplification circuit 38 has an inverting input terminal, a non-inverting input terminal, and an output terminal. Constant voltage A (here, 0.3 V as an example) is applied by the power source 24 to the inverting input terminal of the differential amplification circuit 38. Respective one ends of the switches 42A, 42B, 42C, and the third input terminal 36C of the AD converter 36 are connected to the non-inverting input terminal of the differential amplification circuit 38.

The switch 44A has a first terminal $44A_1$, a second terminal $44A_2$ and a third terminal $44A_3$. The second terminal $44A_2$ is grounded, the first terminal $44A_1$ is connected to the output terminal of the differential amplification circuit 38, and the third terminal $44A_3$ is connected to the gate terminal of the NMOS transistor 40A. At usual times (typically), the switch 44A connects the second terminal $44A_2$ and the third terminal $44A_3$, and, in accordance with an instruction from the CPU 12, cancels the connected state of the second terminal $44A_2$ and the third terminal $44A_3$ and connects the first terminal $44A_1$ and the third terminal $44A_3$. Further, when the switch 44A is connecting the first terminal $44A_1$ and the third terminal $44A_3$, in accordance with an instruction from the CPU 12, the switch 44A cancels the connected state of the first terminal $44A_1$ and the third terminal $44A_3$ and connects the second terminal $44A_2$ and the third terminal $44A_3$. Note that, in the temperature detecting device 10 relating to the present first exemplary embodiment, at usual times, when an instruction signal $A_1$ is inputted to the switch 44A, the first terminal $44A_1$ and the third terminal $44A_3$ are connected. In a case in which the first terminal $44A_1$ and the third terminal $44A_3$ are connected, when an instruction signal $A_2$ is inputted to the switch 44A, the connected state of the first terminal $44A_1$ and the third terminal $44A_3$ is cancelled, and the second terminal $44A_2$ and the third terminal $44A_3$ are connected.

The switch 44B has a first terminal $44B_1$, a second terminal $44B_2$ and a third terminal $44B_3$. The second terminal $44B_2$ is grounded, the first terminal $44B_1$ is connected to the output terminal of the differential amplification circuit 38, and the third terminal $44B_3$ is connected to the gate terminal of the NMOS transistor 40B. At usual times, the switch 44B connects the second terminal $44B_2$ and the third terminal $44B_3$, and, in accordance with an instruction from the CPU 12, cancels the connected state of the second terminal $44B_2$ and the third terminal $44B_3$ and connects the first terminal $44B_1$ and the third terminal $44B_3$. Further, when the switch 44B is connecting the first terminal $44B_1$ and the third terminal $44B_3$, in accordance with an instruction from the CPU 12, the switch 44B cancels the connected state of the first terminal $44B_1$ and the third terminal $44B_3$ and connects the second terminal $44B_2$ and the third terminal $44B_3$. Note that, in the temperature detecting device 10 relating to the present first exemplary embodiment, at usual times, when an instruction signal $B_1$ is inputted to the switch 44B, the first terminal $44B_1$ and the third terminal $44B_3$ are connected. In a case in which the first terminal $44B_1$ and the third terminal $44B_3$ are connected, when an instruction signal $B_2$ is inputted to the switch 44B, the connected state of the first terminal $44B_1$ and the third terminal $44B_3$ is cancelled, and the second terminal $44B_2$ and the third terminal $44B_3$ are connected.

The switch 44C has a first terminal $44C_1$, a second terminal $44C_2$ and a third terminal $44C_3$. The second terminal $44C_2$ is grounded, the first terminal $44C_1$ is connected to the output terminal of the differential amplification circuit 38, and the third terminal $44C_3$ is connected to the gate terminal of the NMOS transistor 40C. At usual times, the switch 44C connects the second terminal $44C_2$ and the third terminal $44C_3$, and, in accordance with an instruction from the CPU 12, cancels the connected state of the second terminal $44C_2$ and the third terminal $44C_3$ and connects the first terminal $44C_1$ and the third terminal $44C_3$. Further, when the switch 44C is connecting the first terminal $44C_1$ and the third terminal $44C_3$, in accordance with an instruction from the CPU 12, the switch 44C cancels the connected state of the first terminal $44C_1$ and the third terminal $44C_3$ and connects the second terminal $44C_2$ and the third terminal $44C_3$. Note that, in the temperature detecting device 10 relating to the present first exemplary embodiment, at usual times, when an instruction signal $C_1$ is inputted to the switch 44C, the first terminal $44C_1$ and the third terminal $44C_3$ are connected. In a case in which the first terminal $44C_1$ and the third terminal $44C_3$ are connected, when an instruction signal $C_2$ is inputted to the switch 44C, the connected state of the first terminal 44C$_1$ and the third terminal 44C$_3$ is cancelled, and the second terminal 44C$_2$ and the third terminal 44C$_3$ are connected.

The other end of the voltage divider resistor 32A is connected to the other end of the switch 42A, the other end of the voltage divider resistor 32B is connected to the other end of the switch 42B, and the other end of the voltage divider resistor 32C is connected to the other end of the switch 42C.

At usual times, the switch 42 is in an off state, and, at usual times, is switched from the off state to an on state in accordance with an instruction from the CPU 12. When the switch 42 is in the on state, the switch 42 is switched from the on state to the off state in accordance with an instruction from the CPU. Note that, in the temperature detecting device 10 relating to the present first exemplary embodiment, in a case in which the switch 42A is in the off state, when the instruction signal A$_1$ is inputted thereto, the switch 42A is switched to the on state. In a case in which the switch 42A is in the on state, when the instruction signal A$_2$ is inputted thereto, the switch 42A is switched to the off state. Further, in a case in which the switch 42B is in the off state, when the instruction signal B$_1$ is inputted thereto, the switch 42B is switched to the on state. In a case in which the switch 42B is in the on state, when the instruction signal B$_2$ is inputted thereto, the switch 42B is switched to the off state. Moreover, in a case in which the switch 42C is in the off state, when the instruction signal C$_1$ is inputted thereto, the switch 42C is switched to the on state. In a case in which the switch 42C is in the on state, when the instruction signal C$_2$ is inputted thereto, the switch 42C is switched to the off state.

The drain terminal of the NMOS transistor 40A is connected to the other end of the voltage divider resistor 32A, the drain terminal of the NMOS transistor 40B is connected to the other end of the voltage divider resistor 32B, and the drain terminal of the NMOS transistor 40C is connected to the other end of the voltage divider resistor 32C. Further, the respective source terminals of the NMOS transistors 40A, 40B, 40C are grounded.

Figure 10:
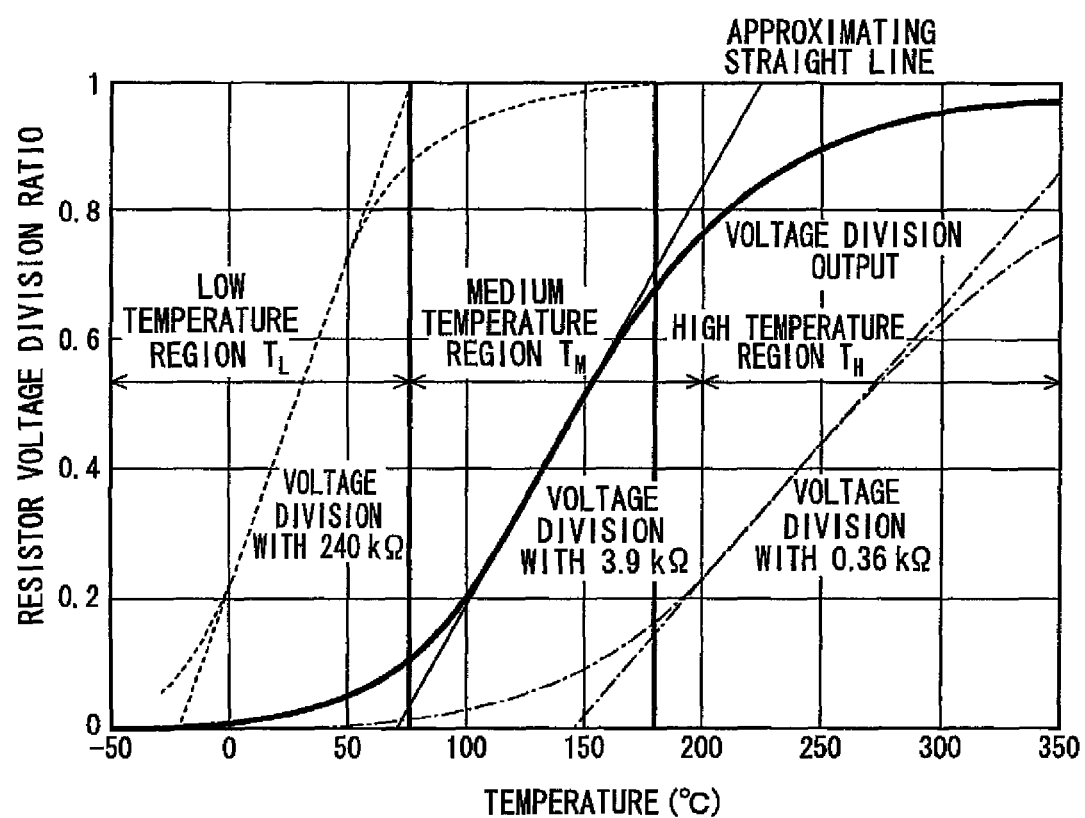
FIG. 10 is a graph showing an example of a case of linearizing electrical resistance values of a thermistor for each of a low temperature region, a medium temperature region and a high temperature region.

In the temperature detecting device 10 relating to the present first exemplary embodiment, −30° C.<T≦350° C. is used as a temperature detectable region T. As shown in FIG. 10 as an example, the temperature detectable region T is sectioned into a low temperature region $T_L$, a medium temperature region $T_M$ and a high temperature region $T_H$. Temperature detection processing, that detects temperatures in the region specified by the user from among these regions, is executed. Note that, in the following description, when referring to the temperature regions without differentiating among the low temperature region $T_L$, the medium temperature region $T_M$ and the high temperature region $T_H$, they are called "sectional detection regions".

Figure 3:
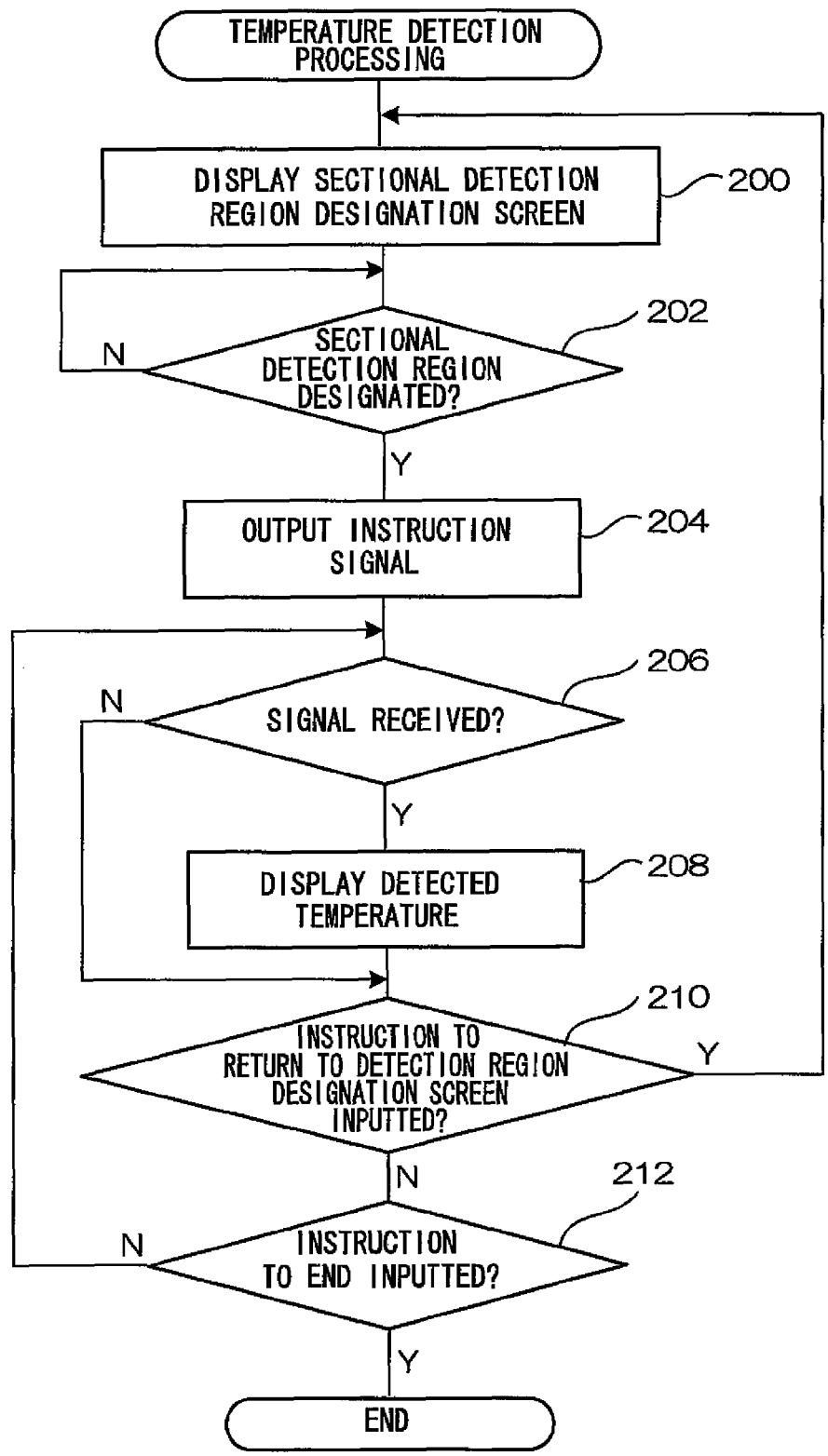
FIG. 3 is a flowchart showing the flow of processings of a temperature detection processing program relating to the first exemplary embodiment.

Operation of the temperature detecting device 10 at the time of executing temperature detection processing is described next with reference to FIG. 3. Note that FIG. 3 is a flowchart showing the flow of the processings of a temperature detection processing program that is executed by the CPU 12 of the temperature detecting device 10 when the power source is turned on (at a usual time). This program is stored in advance in a predetermined area of the ROM 14.

In step 200 of FIG. 3, a designation screen that urges the user to designate a sectional detection region (hereinafter called "sectional detection region designation screen") is displayed on the UI panel 20. Thereafter, the routine moves on to step 202 and stands-by until a sectional detection region is designated by the user via the UI panel 20. Note that a screen in which a rectangular frame having the words "low temperature region" therein, a rectangular frame having the words "medium temperature region" therein, and a rectangular frame having the words "high temperature region" therein can be given as an example of the sectional detection region designation screen. In this case, for example, due to the user touching the displayed portion of any of the rectangular frames on the screen of the UI panel 20 with his/her fingertip, the sectional detection region corresponding to the touched portion is designated.

In next step 204, an instruction signal corresponding to the sectional detection region designated by the processing of above step 202 is outputted to the detecting section 26, and thereafter, the routine moves on to step 206. For example, in present step 204, if the low temperature region $T_L$ was designated by the processing of step 202, the instruction signal A$_1$ is outputted to the switches 42A, 44A, and if the medium temperature region $T_M$ was designated by the processing of step 202, the instruction signal B$_1$ is outputted to the switches 42B, 44B, and if the high temperature region $T_H$ was designated by the processing of step 202, the instruction signal C$_1$ is outputted to the switches 42C, 44C.

Accordingly, when the low temperature region $T_L$ is designated by the processing of step 202, in accordance with the inputted instruction signal A$_1$, the switch 42A is switched from the off state to the on state, and, in accordance with the inputted instruction signal A$_1$, the switch 44A cancels the connected state of the second terminal 44A$_2$ and the third terminal 44A$_3$ and connects the first terminal 44A$_1$ and the third terminal 44A$_3$. Due thereto, the conducting state between the drain terminal and the source terminal of the NMOS transistor 40A is controlled by the output of the differential amplification circuit 38, and the constant voltage A is applied to the other end of the voltage divider resistor 32A. Therefore, the potential difference between the one end of the thermistor 28 and the other end of the voltage divider resistor 32A is maintained at a predetermined potential difference (here, 1.7 v as an example), and voltage division output, that corresponds to a voltage obtained by voltage dividing, at the thermistor 28 and the voltage divider resistor 32A, between the power source line 30 to which constant voltage V$_{REFH}$ is applied and the other end of the voltage divider resistor 32A to which the constant voltage A is applied, is inputted to the second input terminal 36B of the AD converter 36.

Further, when the medium temperature region $T_M$ is designated by the processing of step 202, in accordance with the inputted instruction signal B$_1$, the switch 42B is switched from the off state to the on state, and, in accordance with the inputted instruction signal B$_1$, the switch 44B cancels the connected state of the second terminal 44B$_2$ and the third terminal 44B$_3$ and connects the first terminal 44B$_1$ and the third terminal 44B$_3$. Due thereto, the conducting state between the drain terminal and the source terminal of the NMOS transistor 40B is controlled by the output of the differential amplification circuit 38, and the constant voltage A is applied to the other end of the voltage divider resistor 32B. Therefore, the potential difference between the one end of the thermistor 28 and the other end of the voltage divider resistor 32B is maintained at a predetermined potential difference, and voltage division output, that corresponds to a voltage obtained by voltage dividing, at the thermistor 28 and the voltage divider resistor 32B, between the power source line 30 to which the constant voltage V$_{REFH}$ is applied and the other end of the voltage divider resistor 32B to which the constant voltage A is applied, is inputted to the second input terminal 36B of the AD converter 36.

Moreover, when the high temperature region $T_H$ is designated by the processing of step 202, in accordance with the inputted instruction signal C$_1$, the switch 42C is switched from the off state to the on state, and, in accordance with the inputted instruction signal $C_1$, the switch 44C cancels the connected state of the second terminal $44C_2$ and the third terminal $44C_3$ and connects the first terminal $44C_1$ and the third terminal $44C_3$. Due thereto, the conducting state between the drain terminal and the source terminal of the NMOS transistor 40C is controlled by the output of the differential amplification circuit 38, and the constant voltage A is applied to the other end of the voltage divider resistor 32C. Therefore, the potential difference between the one end of the thermistor 28 and the other end of the voltage divider resistor 32C is maintained at a predetermined potential difference, and voltage division output, that corresponds to a voltage obtained by voltage dividing, at the thermistor 28 and the voltage divider resistor 32C, between the power source line 30 to which the constant voltage $V_{REFH}$ is applied and the other end of the voltage divider resistor 32C to which the constant voltage A is applied, is inputted to the second input terminal 36B of the AD converter 36.

In step 206, it is judged whether or not a digital signal that expresses the voltage division output has been received from the AD converter 36 of the detecting section 26. If the judgment is negative, the routine moves on to step 210. If the judgment is affirmative, the routine moves on to step 208 where the detected temperature, that corresponds to the voltage division output expressed by the digital signal received in step 206, is displayed on the UI panel 20, and thereafter, the routine moves on to step 210. Note that, in present step 206, the detected temperature is derived by referring to a database in which voltage division outputs and predetermined detected temperatures are set in correspondence with one another in advance, and the detected temperature that is derived is displayed on the UI panel 20. The database is stored in advance in the ROM 14.

In step 210, it is judged whether or not an instruction to cause the UI panel 20 to display the sectional detection region designation screen has been inputted via the UT panel 20. If the judgment is affirmative, the routine returns to step 200, whereas if the judgment is negative, the routine moves on to step 212. Note that, when the judgment is affirmative in the processing of present step 210, control is carried out such that the switch 42, that is in the on state at the present point in time, is switched to the off state, and the corresponding switch 44 is controlled such that the connected state of the gate terminal of the NMOS transistor 40 and the output terminal of the differential amplification circuit 38 at the present point in time is cancelled. Concretely, when the switch 42A is in the on state and the gate terminal of the switch 44A and the output terminal of the differential amplification circuit 38 are connected, the instruction signal $A_2$ is outputted to the switch 42A and the switch 44A. When the switch 42B is in the on state, and when the gate terminal of the switch 44B and the output terminal of the differential amplification circuit 38 are connected, the instruction signal $B_2$ is outputted to the switch 42B and the switch 44B. When the switch 42C is in the on state, and when the gate terminal of the switch 44C and the output terminal of the differential amplification circuit 38 are connected, the instruction signal $C_2$ is outputted to the switch 42C and the switch 44C. Due thereto, the respective switches are returned to their states at usual times (initial states).

In step 212, it is judged whether or not an instruction to end the temperature detection processing has been inputted via the UI panel 20. If the judgment is negative, the routine returns to above step 206, whereas if the judgment is affirmative, the present temperature detection processing program ends.

As described above in detail, the temperature detecting device 10 relating to the present first exemplary embodiment has: the thermistor 28 that serves as a detection element, and to whose one end the constant voltage $V_{REFH}$ (first constant voltage) is applied, and whose electrical resistance value varies in accordance with changes in temperature (a physical amount serving as an object of detection); the voltage divider resistors 32A, 32B, 32C (plural resistance elements) whose respective one ends are connected to the other end of the thermistor 28 and that are connected to one another in parallel, and that have electrical resistance values that are made to correspond in advance to the low temperature region $T_L$, the medium temperature region $T_M$ and the high temperature region $T_H$ (plural sectional detection regions that are obtained by dividing a detection region of temperatures into sections), respectively; the NMOS transistors 40 that are provided in respective correspondence with the voltage divider resistors 32, and that serve as switching elements that have a drain terminal serving as a first terminal that is connected to the other end of the corresponding voltage divider resistor 32, a source terminal serving as a second terminal that is grounded, and a gate terminal serving as a control terminal that, when voltage of a predetermined magnitude or greater is applied, sets the drain terminal and the source terminal, that are in a non-conducting state at usual times, in a conducting state; the CPU 12 and the voltage divider resistor switching circuit 34 serving as a control unit that, in accordance with the conducting/non-conducting state between the drain terminal and the source terminal of the NMOS transistor 40 whose drain terminal is connected to the other end of the voltage divider resistor 32 that corresponds to a predetermined sectional detection region, control the voltage applied to the gate terminal of the NMOS transistor 40 that corresponds to that voltage divider resistor 32 such that a potential difference, between the one end of the thermistor 28 and the other end of the voltage divider resistor 32 corresponding to the predetermined sectional detection region, is maintained at a predetermined potential difference; and the AD converter 36 that converts the potential, that is obtained by the potential difference between the constant voltage $V_{REFH}$ and the drain terminal being voltage-divided at the thermistor 28 and the voltage divider resistor 32, into a digital value, and at which the free scale (first reference potential) is the constant voltage $V_{REFH}$, and the zero scale (second reference potential) is the voltage applied to the drain terminal of the NMOS transistor 40. Due thereto, in accordance with the conducting/non-conducting state between the drain terminal and the source terminal of the NMOS transistor 40, the voltage that is applied to the gate terminal of the NMOS transistor 40 is controlled such that the potential difference between the one end of the thermistor 28 and the other end of the voltage divider resistor 32 is maintained at a predetermined potential difference. Therefore, at all of the sectional detection regions, detection errors due to the electrical resistance value of the NMOS transistor 40 can be suppressed without changing the structure of the NMOS transistor 40.

Further, in accordance with the temperature detecting device 10 relating to the present exemplary embodiment, the voltage divider resistor switching circuit 34 has the differential amplification circuit 38 that has the inverting input terminal, to which is applied the constant voltage A that is a voltage value that is greater than the ground voltage value and less than the voltage value of the constant voltage $V_{REFH}$, and the non-inverting input terminal that is connected to the other ends of the voltage divider resistors 32, and the output terminal that is connected to the gate terminals of the NMOS transistors 40. Due thereto, the potential difference between the one end of the thermistor 28 and the other end of the voltage divider resistor 32 can easily be maintained at a predetermined potential difference.

Further, the temperature detecting device 10 relating to the present exemplary embodiment further has the UI panel 20 that serves as a detection region designating unit that designates any of the sectional detection regions. The voltage divider resistor switching circuit 34 has: the differential amplification circuit 38 that has the inverting input terminal, to which is applied the constant voltage A that is a voltage value that is greater than the ground voltage value and less than the voltage value of the constant voltage $V_{REFH}$, and the non-inverting input terminal that is connected to the other ends of the voltage divider resistors 32, and the output terminal that is connected to the gate terminals of the NMOS transistors 40; the switches 44 that are provided in respective correspondence with the NMOS transistors 40, and that have second terminals $44A_2$ ($44B_2$, $44C_2$) serving as second constant voltage terminals that are respectively grounded, and that serve as a first switching unit that can switch between a state of connecting the second terminal $44A_2$ ($44B_2$, $44C_2$) and the gate terminal of the corresponding NMOS transistor 40 and a state of connecting the output terminal of the differential amplification circuit 38 and the gate terminal of the corresponding NMOS transistor 40; and switches 42 that are provided in respective correspondence with the voltage divider resistors 32, and whose one ends are connected to the non-inverting input terminal and whose other ends are respectively connected to other ends of the corresponding voltage divider resistors 32, and that serve as a second switching unit that can switch between a state of connecting the non-inverting input terminal and the other end of the corresponding voltage divider resistor 32 and a state of not connecting the non-inverting input terminal and the other end of the corresponding voltage divider resistor 32. In accordance with the conducting/non-conducting state between the drain terminal and the source terminal of the NMOS transistor 40 whose drain terminal is connected to the other end of the voltage divider resistor 32 that corresponds to the sectional detection region designated by the user via the UI panel 20, the CPU 12 controls the switches 42, 44 such that the potential difference between the one end of the thermistor 28 and the other end of the voltage divider resistor 32 corresponding to that sectional detection region, is maintained at a predetermined potential difference. Due thereto, at all of the low temperature region $T_L$, the medium temperature region $T_M$ and the high temperature region $T_H$, the potential difference between the one end of the thermistor 28 and the other end of the voltage divider resistor 32 can easily be maintained at a predetermined potential difference.

Second Exemplary Embodiment

The above first exemplary embodiment describes an example of a case in which there is the single thermistor 28, but the present second exemplary embodiment describes, as an example, a temperature detecting device 10A that uses plural thermistors. Note that, in the present second exemplary embodiment, structural elements that are the same as those of the first exemplary embodiment are denoted by the same reference numerals, and description thereof is omitted.

FIG. 1 is a structural drawing showing an example of the structure of the temperature detecting device 10A relating to the present second exemplary embodiment. As shown in FIG. 1, the temperature detecting device 10A relating to the present second exemplary embodiment differs from the temperature detecting device 10 described in the first exemplary embodiment only with regard to the point that the temperature detecting device 10A has a detecting section 26A instead of the detecting section 26.

Figure 4:
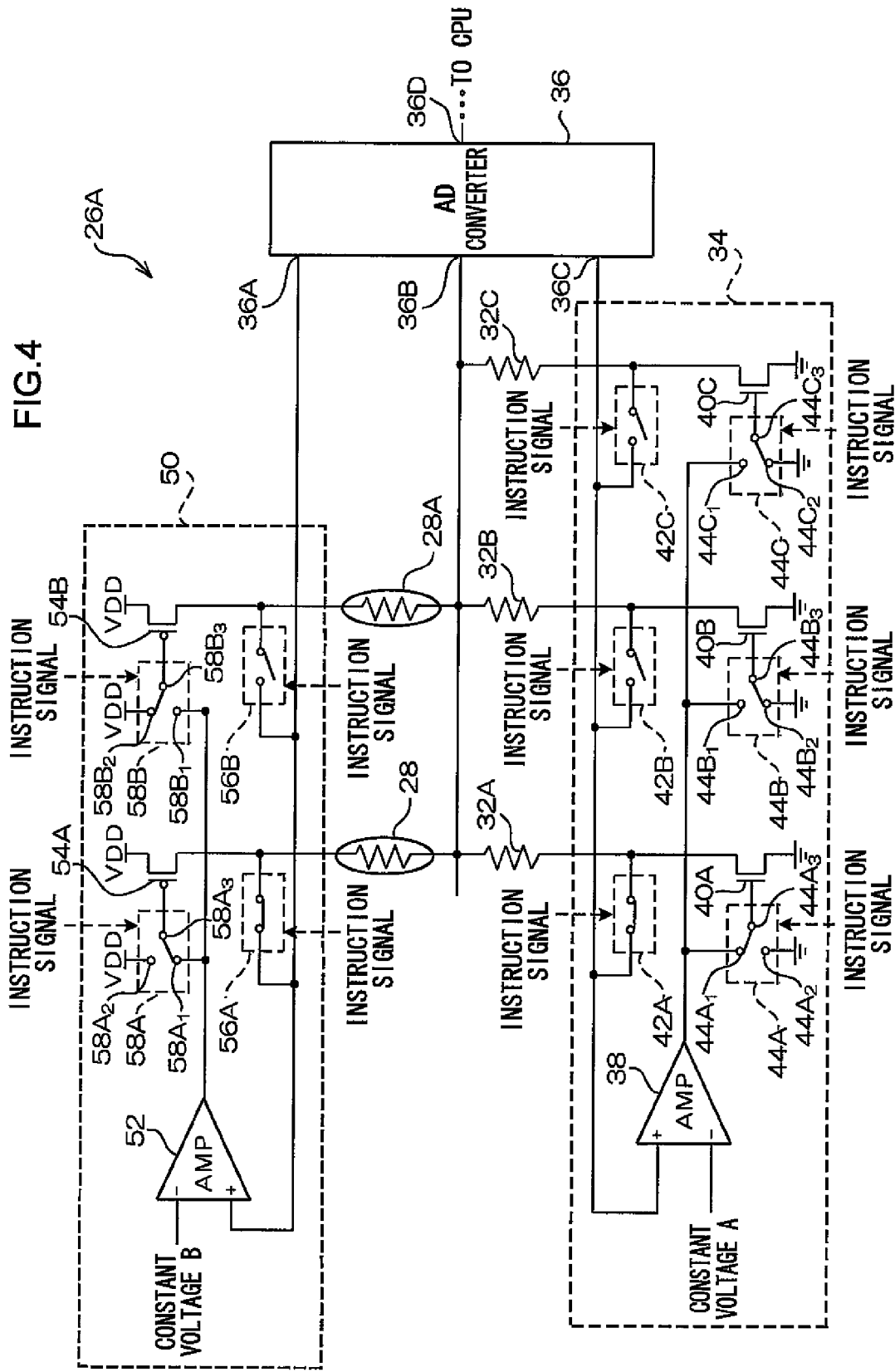
FIG. 4 is a structural drawing showing an example of the structure of a detecting section relating to the second exemplary embodiment.

FIG. 4 is a structural drawing showing an example of the structure of the detecting section 26A relating to the present second exemplary embodiment. As shown in FIG. 4, as compared with the detecting section 26 described in the first exemplary embodiment, the detecting section 26A relating to the present second exemplary embodiment differs only with regard to the point of using a thermistor switching circuit 50 instead of the power source line 30, and the point of being further provided with a thermistor 28A.

The thermistor switching circuit 50 is structured to include a differential amplification circuit 52, P-channel-type MOS field effect transistors (hereinafter called "PMOS transistors") 54A, 54B, single pole single throw switches 56A, 56B, and single pole double throw switches 58A, 58B. Note that, hereinafter, when there is no need to differentiate between the PMOS transistors 54A, MB, they are called the "PMOS transistors 54" without the final letter appended thereto. When there is no need to differentiate between the switches 56A, 56B, they are called the "switches 56" without the final letter appended thereto. When there is no need to differentiate between the switches 58A, 58B, they are called the "switches 58" without the final letter appended thereto.

The differential amplification circuit 52 has an inverting input terminal, a non-inverting input terminal, and an output terminal. Constant voltage B (here, 2 V as an example) is applied to the inverting input terminal of the differential amplification circuit 52 by the power source 24. Respective one ends of the switches 56A, 56B are connected to the non-inverting input terminal of the differential amplification circuit 52. Further, the first input terminal 36A of the AD converter 36 is connected to the non-inverting input terminal of the differential amplification circuit 52.

The switch 58A has a first terminal $58A_1$, a second terminal $58A_2$ and a third terminal $58A_3$. Constant voltage VDD (here, 3 V as an example) is applied to the second terminal $58A_2$ by the power source 24. The first terminal $58A_1$ is connected to the output terminal of the differential amplification circuit 52, and the third terminal $58A_3$ is connected to the gate terminal of the PMOS transistor 54A. At usual times, the switch 58A connects the second terminal $58A_2$ and the third terminal $58A_3$, and, in accordance with an instruction from the CPU 12, cancels the connected state of the second terminal $58A_2$ and the third terminal $58A_3$ and connects the first terminal $58A_1$ and the third terminal $58A_3$. Further, when the switch 58A is connecting the first terminal $58A_1$ and the third terminal $58A_3$, in accordance with an instruction from the CPU 12, the switch 58A cancels the connected state of the first terminal $58A_1$ and the third terminal $58A_3$ and connects the second terminal $58A_2$ and the third terminal $58A_3$. Note that, in the temperature detecting device 10A relating to the present second exemplary embodiment, at usual times, when an instruction signal $D_1$ is inputted to the switch 58A, the first terminal $58A_1$ and the third terminal $58A_3$ are connected. In a case in which the first terminal $58A_1$ and the third terminal $58A_3$ are connected, when an instruction signal $D_2$ is inputted to the switch 58A, the connected state of the first terminal $58A_1$ and the third terminal $58A_3$ is cancelled.

The switch 58B has a first terminal $58B_1$, a second terminal $58B_2$ and a third terminal $58B_3$. The constant voltage VDD is applied to the second terminal $58B_2$ by the power source 24. The first terminal $58B_1$ is connected to the output terminal of the differential amplification circuit 52, and the third terminal $58B_3$ is connected to the gate terminal of the PMOS transistor 54B. At usual times, the switch 58B connects the second terminal $58B_2$ and the third terminal $58B_3$, and, in accordance with an instruction from the CPU 12, cancels the connected state of the second terminal $58B_2$ and the third terminal $58B_3$ and connects the first terminal $58B_1$ and the third terminal $58B_3$. Further, when the switch 58B is connecting the first terminal $58B_1$ and the third terminal $58B_3$, in accordance with an instruction from the CPU 12, the switch 58B cancels the connected state of the first terminal $58B_1$ and the third terminal $58B_3$ and connects the second terminal $58B_2$ and the third terminal $58B_3$. Note that, in the temperature detecting device 10A relating to the present second exemplary embodiment, at usual times, when an instruction signal $E_1$ is inputted to the switch 58B, the first terminal $58B_1$ and the third terminal $58B_3$ are connected. In a case in which the first terminal $58B_1$ and the third terminal $58B_3$ are connected, when an instruction signal $E_2$ is inputted to the switch 58B, the connected state of the first terminal $58B_1$ and the third terminal $58B_3$ is cancelled.

One end of the thermistor 28 is connected to the other end of the switch 56A, and one end of the thermistor 28A is connected to the other end of the switch 56B.

At usual times, the switch 56 is in an off state, and, in accordance with an instruction from the CPU 12, is switched from the off state to an on state, and from the on state to the off state. Note that, in the temperature detecting device 10A relating to the present second exemplary embodiment, in a case in which the switch 56A is in the off state, when the instruction signal $D_1$ is inputted thereto, the switch 56A is switched to the on state. In a case in which the switch 56A is in the on state, when the instruction signal $D_2$ is inputted thereto, the switch 56A is switched to the off state. Further, in a case in which the switch 56B is in the off state, when the instruction signal $E_1$ is inputted thereto, the switch 56B is switched to the on state. In a case in which the switch 56B is in the on state, when the instruction signal $E_2$ is inputted thereto, the switch 56B is switched to the off state.

The drain terminal of the PMOS transistor 54A is connected to one end of the thermistor 28, and the drain terminal of the PMOS transistor 54B is connected to one end of the thermistor 28A. Further, the constant voltage VDD is applied by the power source 24 to the respective source terminals of the PMOS transistors 54A, 54B.

The other end of the thermistor 28A is connected to respective one ends of the voltage divider resistors 32A, 32B, 32C and to the second input terminal 36B of the AD converter 36.

Figure 5:
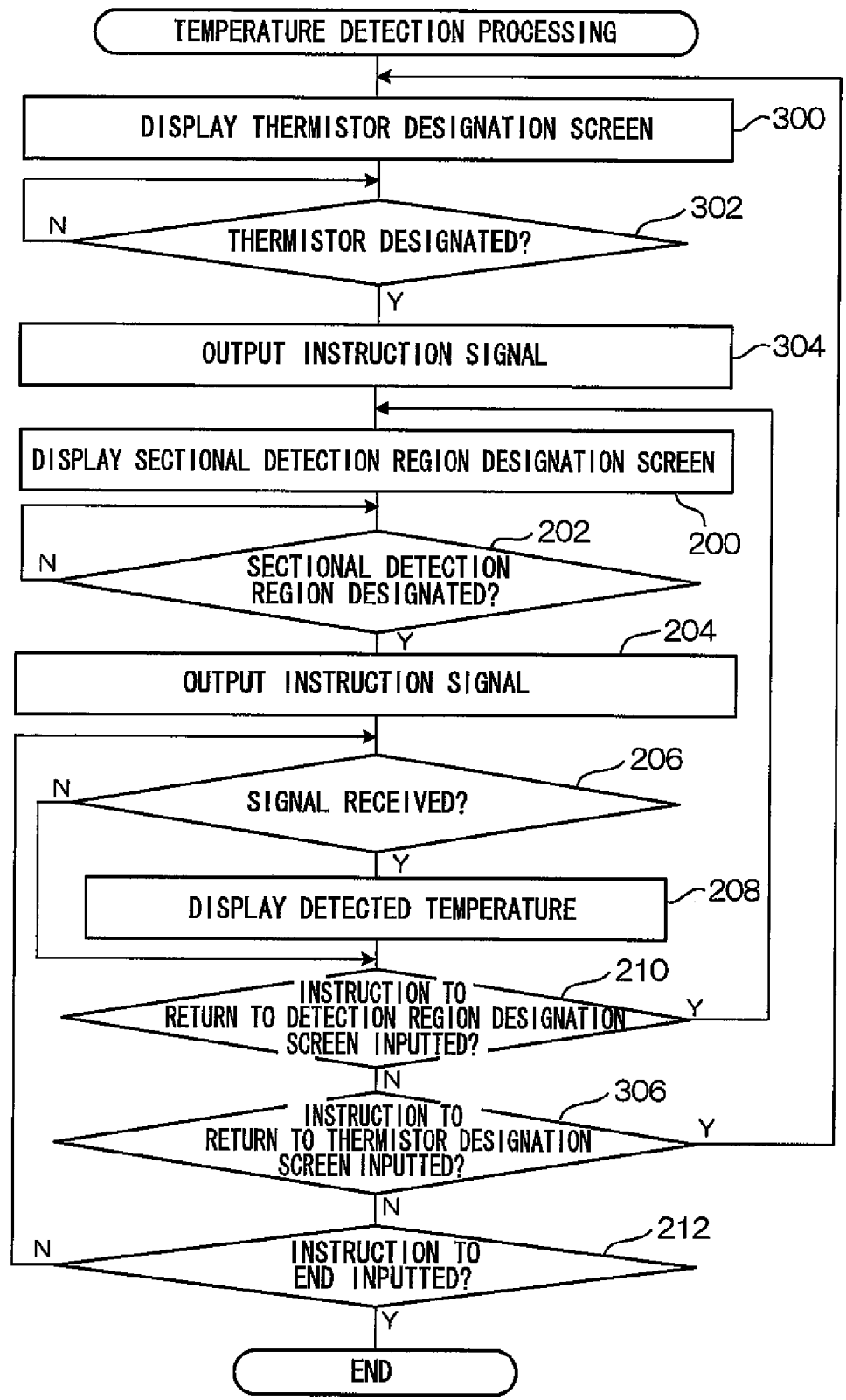
FIG. 5 is a flowchart showing the flow of processings of a temperature detection processing program relating to the second exemplary embodiment.
Figure 6:
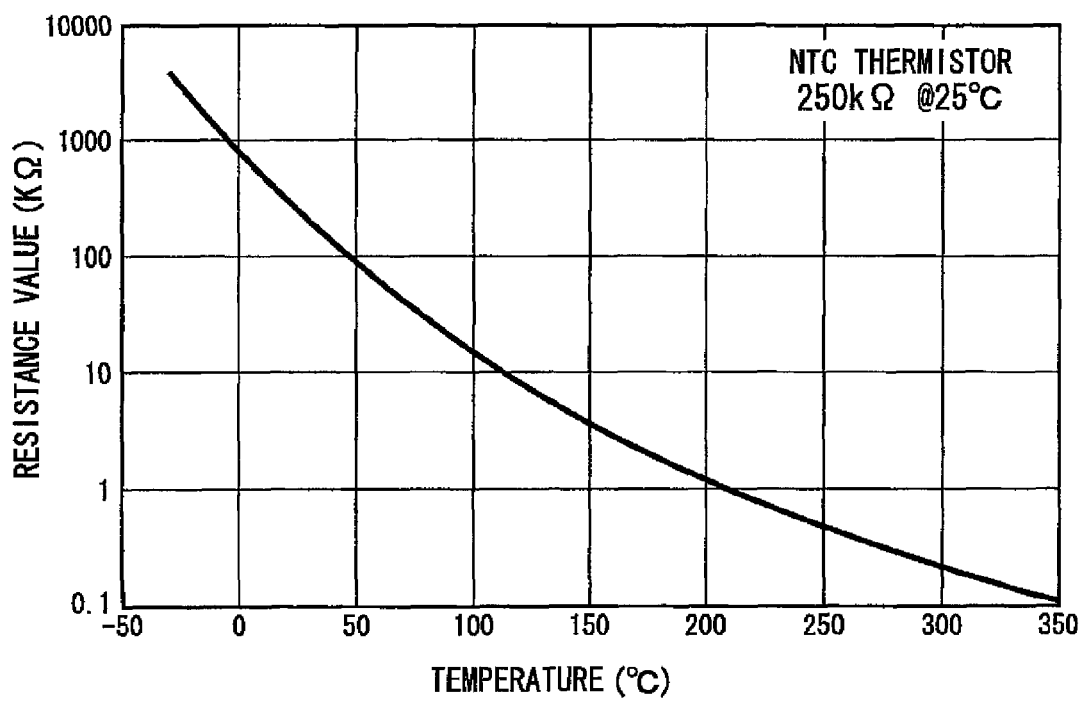
FIG. 6 is a graph showing the relationship between detected temperature and electrical resistance value of an NTC thermistor that is assembled in a conventional temperature detecting device.
Figure 7:
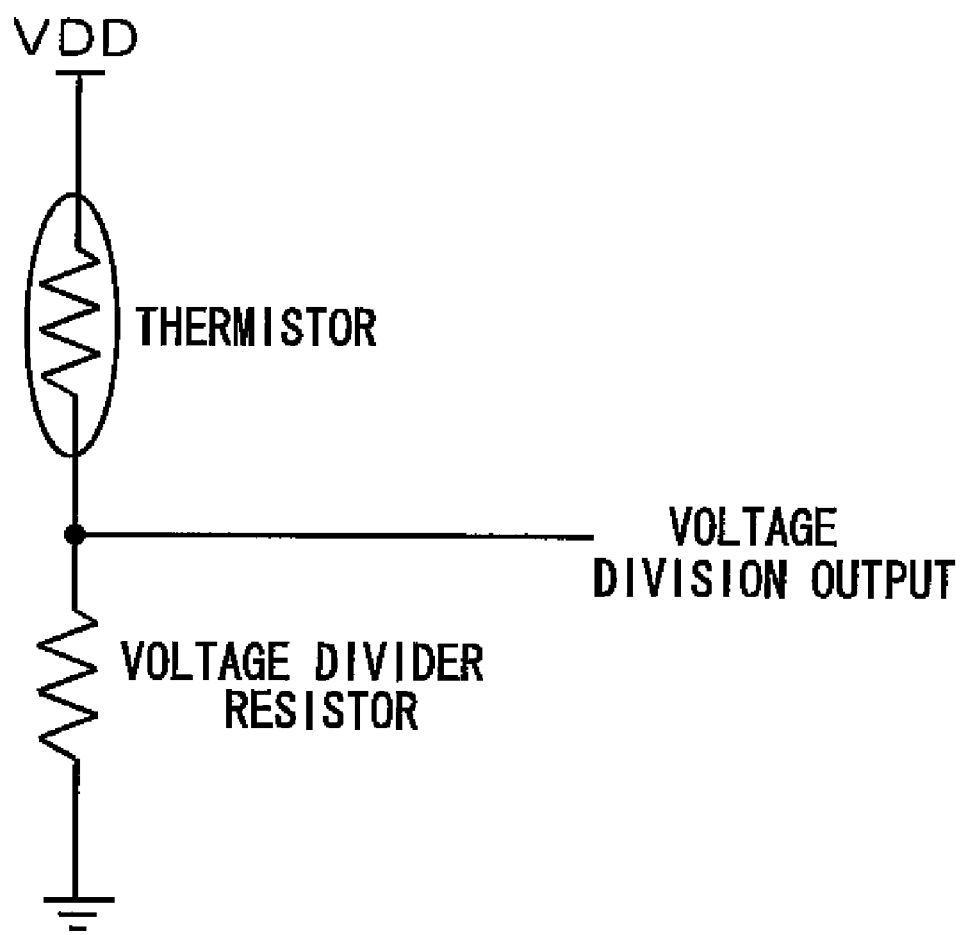
FIG. 7 is a structural drawing showing the structure of a conventional temperature detecting device.
Figure 8:
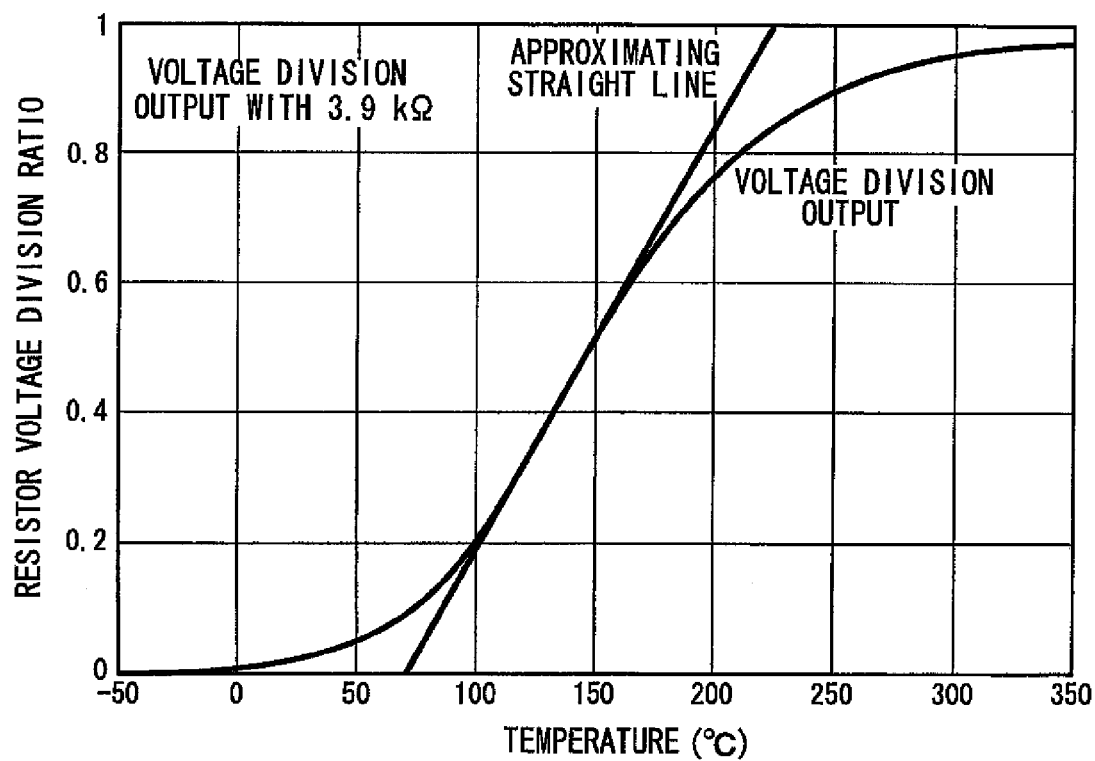
FIG. 8 is a graph showing an example of a case of linearizing electrical resistance values of a thermistor.
Figure 9:
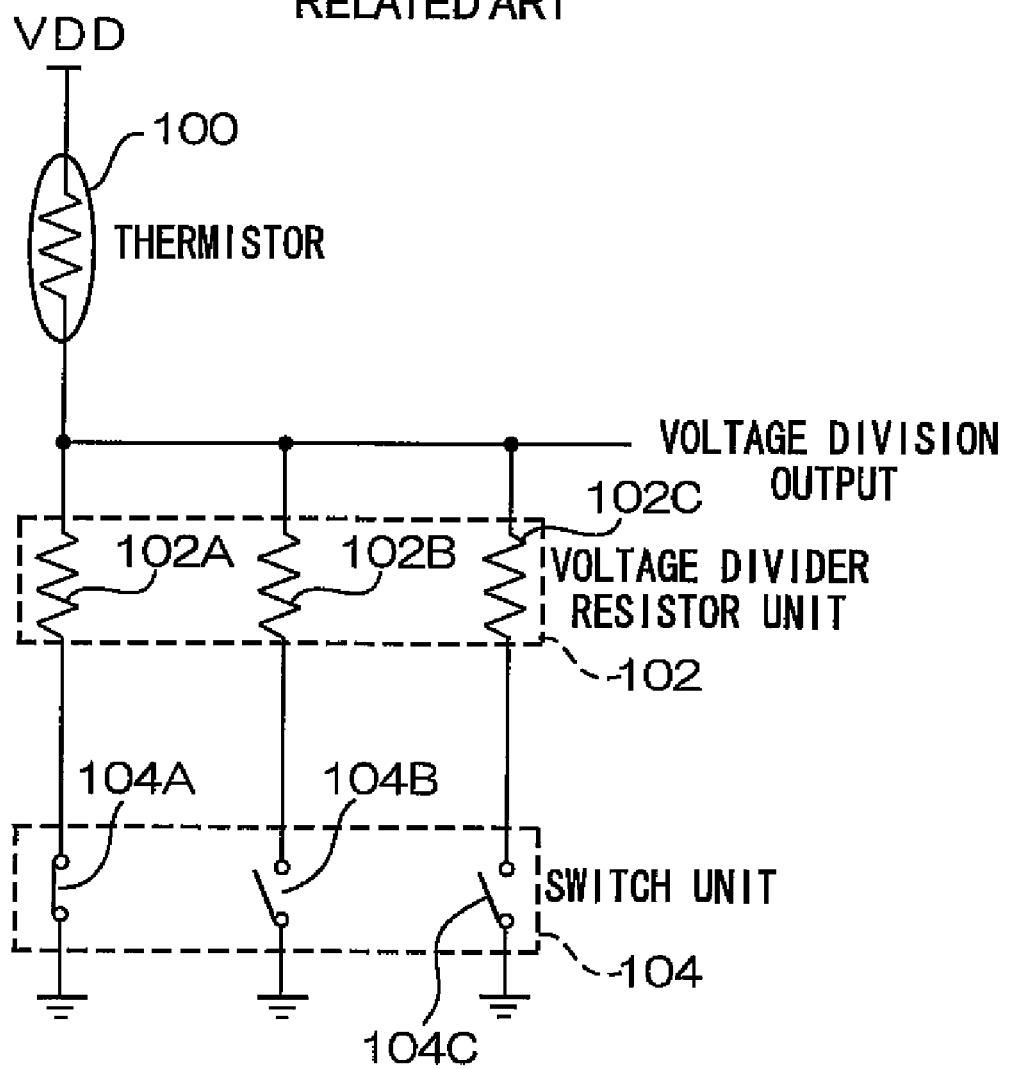
FIG. 9 is a structural drawing showing the structure of a conventional temperature detecting device.

Operation of the temperature detecting device 10A at the time of executing temperature detection processing relating to the present second exemplary embodiment is described next with reference to FIG. 5. Note that FIG. 5 is a flowchart showing the flow of the processings of a temperature detection processing program that is executed by the CPU 12 of the temperature detecting device 10A when the power source is turned on. This program is stored in advance in a predetermined area of the ROM 14. Further, the flowchart shown in FIG. 5 differs from the flowchart shown in FIG. 3 with regard to the points that steps 300, 302, 304 are added at the stage before step 200, and step 306 is added between step 210 and step 212. Therefore, steps in FIG. 5 that carry out the same processings as the program shown in FIG. 3 are denoted by the same step numbers as in FIG. 3, and description thereof is omitted. Here, only the processings that differ from the program shown in FIG. 3 are described.

In step 300 of FIG. 5, a designation screen that urges the user to designate a thermistor (hereinafter called "thermistor designation screen") is displayed on the UI panel 20. Thereafter, the routine moves on to step 302 and stands-by until a thermistor is designated by the user via the UI panel 20. Note that a screen, in which are displayed a rectangular frame having therein the words "thermistor A" indicating the thermistor 28 and a rectangular frame having therein the words "thermistor B" indicating the thermistor 28A, can be given as an example of the thermistor designation screen. In this case, due to the user touching the displayed portion of either of the rectangular frames on the screen of the UI panel 20 with his/her fingertip for example, the thermistor corresponding to the touched portion is designated.

In next step 304, an instruction signal corresponding to the thermistor designated by the processing of above step 302 is outputted to the detecting section 26A, and thereafter, the routine moves on to step 200. For example, in present step 304, if thermistor A was designated by the processing of step 302, the instruction signal $D_1$ is outputted to the switches 56A, 58A, and if thermistor B was designated by the processing of step 302, the instruction signal $E_1$ is outputted to the switches 56B, 58B.

Accordingly, when thermistor A is designated by the processing of step 302, in accordance with the inputted instruction signal $D_1$, the switch 56A is switched from the off state to the on state, and, in accordance with the inputted instruction signal $D_1$, the switch 58A cancels the connected state of the second terminal $58A_2$ and the third terminal $58A_3$ and connects the first terminal $58A_1$ and the third terminal $58A_3$. Due thereto, the conducting state between the drain terminal and the source terminal of the PMOS transistor 54A is controlled by the output of the differential amplification circuit 52, and the constant voltage B is applied to one end of the thermistor 28. Therefore, voltage division output, that corresponds to a voltage obtained by voltage dividing, at the voltage divider resistor 32 and the thermistor 28, between the one end of the thermistor 28 to which the constant voltage B is applied and the other end of the voltage divider resistor 32 that is designated in processing of a stage after, is inputted to the second input terminal 36B of the AD converter 36.

Further, when thermistor B is designated by the processing of step 302, in accordance with the inputted instruction signal $E_1$, the switch 56B is switched from the off state to the on state, and, in accordance with the inputted instruction signal $E_1$, the switch 58B cancels the connected state of the second terminal $58B_2$ and the third terminal $58B_3$ and connects the first terminal $58B_1$ and the third terminal $58B_3$. Due thereto, the conducting state between the drain terminal and the source terminal of the PMOS transistor 54B is controlled by the output of the differential amplification circuit 52, and the constant voltage B is applied to one end of the thermistor 28A. Therefore, voltage division output, that corresponds to a voltage obtained by voltage dividing, at the voltage divider resistor 32 and the thermistor 28A, between the one end of the thermistor 28A to which the constant voltage B is applied and the other end of the voltage divider resistor 32 that is designated in processing of a stage after, is inputted to the second input terminal 36B of the AD converter 36.

If the judgment in the processing of step 210 is negative, the routine moves on to step 306 where it is judged whether or not an instruction to cause the UI panel 20 to display the thermistor designation screen has been inputted via the UI panel 20. If the judgment is affirmative, the routine returns to step 300, whereas if the judgment is negative, the routine moves on to step 212. Note that, when the judgment is affirmative in the processing of present step 306, control is carried out such that the switch 56, that is in the on state at the present point in time, is switched to the off state, and the corresponding switch 58 is controlled such that the connected state of the gate terminal of the PMOS transistor 54 and the output terminal of the differential amplification circuit 52 at the present point in time is cancelled. Concretely, when the switch 56A is in the on state and the gate terminal of the switch 56A and the output terminal of the differential amplification circuit 52 are connected, the instruction signal $D_2$ is outputted to the switch 56A and the switch 58A. When the switch 56B is in the on state and the gate terminal of the switch 58B and the output terminal of the differential amplification circuit 52 are connected, the instruction signal $E_2$ is outputted to the switch 56B and the switch 58B. Due thereto, the respective switches are returned to their initial states.

As described above in detail, the temperature detecting device 10A relating to the present second exemplary embodiment has the CPU 12 and the thermistor switching circuit 50 that connect the thermistors 28, 28A in parallel, and that connect the respective other ends in series to one ends of the voltage resistor dividers 32, and that serve as a selective application unit that selectively apply the constant voltage B to the respective one ends of the thermistors 28, 28A. Due thereto, the temperature can be detected by using an arbitrary thermistor among the thermistors 28, 28A.

Further, in accordance with the temperature detecting device 10A relating to the present second exemplary embodiment, the thermistor switching circuit 50 has the PMOS transistors 54 that are provided in respective correspondence with the thermistors 28, 28A, and that serve as second switching elements having a drain terminal serving as a first terminal that is connected to one end of the corresponding thermistor, a source terminal serving as a second terminal to which the constant voltage VDD is applied, and a gate terminal serving as a control terminal that, when voltage of a voltage value that is less than or equal to a threshold value is applied, sets the drain terminal and the source terminal, that are in a non-conducting state at usual times, in a conducting state. In accordance with the conducting/non-conducting state between the drain terminal and the source terminal of the PMOS transistor 54 whose drain terminal is connected to one end of a predetermined thermistor, the CPU 12 controls the voltage that is applied to the gate terminal of the PMOS transistor 54 corresponding to the predetermined thermistor, such that the voltage that is applied to the one end of the predetermined thermistor is maintained at the constant voltage B. Due thereto, the voltage that is applied to the one end of the predetermined thermistor can easily be maintained at the constant voltage B.

Further, the temperature detecting device 10A relating to the present second exemplary embodiment further has the UT panel 20 that serves as a detection element designating unit that designates either of the thermistors 28, 28A. The thermistor switching circuit 50 has: the differential amplification circuit 52 (second differential amplification circuit) that has the inverting input terminal to which the constant voltage B is applied, and the non-inverting input terminal that is connected to one ends of the thermistors 28, 28A, and the output terminal that is connected to the gate terminals of the PMOS transistors 54; the switches 58 that are provided in respective correspondence with the PMOS transistors 54, and that have the second terminals $58A_2$ ($58B_2$, $58C_2$) serving as fourth constant voltage terminals to which the constant voltage VDD is respectively applied, and that serve as a third switching unit that can switch between a state of connecting the second terminal and the gate terminal of the PMOS transistor 54 and a state of connecting the output terminal of the differential amplification circuit 52 and the gate terminal of the PMOS transistor 54; and the switches 56 that are provided in respective correspondence with the thermistors 28, 28A, and whose one ends are connected to the non-inverting input terminal of the differential amplification circuit 52 and whose other ends are connected to one ends of the corresponding thermistors, and that serve as a fourth switching unit that can switch between a state of connecting the non-inverting input terminal of the differential amplification circuit 52 and the one end of the corresponding thermistor and a state of not connecting the non-inverting input terminal of the differential amplification circuit 52 and the one end of the corresponding thermistor. In accordance with the conducting/non-conducting state between the drain terminal and the source terminal of the PMOS transistor 54 whose drain terminal is connected to the one end of the thermistor designated by the user via the UI panel 20, the CPU 12 controls the switches 56, 58 such that the voltage applied to the one end of that thermistor is maintained at the constant voltage B. Due thereto, at both of the thermistors 28, 28A, the voltage applied to the one end can be easily maintained at the constant voltage B.

Further, the above respective exemplary embodiments describe examples of cases in which, by connecting the gate terminal of one of the NMOS transistors 40A, 40B, 40C to the output terminal of the differential amplification circuit 38, the constant voltage A is applied to the other end of the corresponding voltage divider resistor. However, the present invention is not limited to the same. For example, by connecting the gate terminals of any two of or all of the NMOS transistors 40A, 40B, 40C to the output terminal of the differential amplification circuit 38, the constant voltage A may be applied to the other ends of the corresponding voltage divider resistors 32.

Further, in the above respective exemplary embodiments, the output terminal of the differential amplification circuit 38 is commonly connected to the respective gate terminals of the NMOS transistors 40A, 40B, 40C, but the present invention is not limited to the same. Differential amplification circuits that are similar to the differential amplification circuit 38 may be provided in a one-to-one correspondence with respect to the respective NMOS transistors 40A, 40B, 40C, and the output terminal of the corresponding differential amplification circuit may be connected to the gate terminal of the NMOS transistor 40.

Moreover, although the above respective exemplary embodiments describe, as an example, the voltage divider resistor switching circuit 34 that is structured to include the three voltage divider resistors 32, the number of the voltage divider resistors is not limited. When broadening the range of the detectable region T described in the above respective exemplary embodiments, for example, at least one of a voltage divider resistor, that has an electrical resistance value that is larger than that of the voltage divider resistor 32A, and a voltage divider resistor, that has an electrical resistance value that is smaller than that of the voltage divider resistor 32C, may be connected in parallel to the voltage divider resistors 32A, 32B, 32C, and the differential amplification circuit 38, the NMOS transistor 40, and the switches 42, 44 may be connected to the additionally connected voltage divider resistor in the same way as to the voltage divider resistors 32A, 32B, 32C. Conversely, when narrowing the range of the detectable region T described in the above respective exemplary embodiments, for example, any one or two of the voltage divider resistors 32A, 32B, 32C may be eliminated.

Still further, in the above respective exemplary embodiments, the detected temperature is derived by referring to a database that stores, in advance, voltage division outputs and detected temperatures in correspondence with one another. However, the present invention is not limited to the same. The voltage value may be derived by using a predetermined calculation formula in which the voltage division output is the input and the detected temperature is the solution.

Further, the above respective exemplary embodiments describe, as examples, a case in which the source terminals of the NMOS transistors 40 and the second terminals 44A₂, 44B₂, 44C₂ are grounded, but the present invention is not limited to the same. A constant voltage, that is a lower voltage than the constant voltage B (or the constant voltage $V_{REFH}$) may be commonly applied to the source terminals of the NMOS transistors 40 and the second terminals 44A₂, 44B₂, 44C₂. Note that, in this case, the constant voltage A is made to be a voltage value that is greater than the constant voltage that is commonly applied to the source terminals of the NMOS transistors 40 and the second terminals 44A₂, 44B₂, 44C₂, and is smaller than the constant voltage B.

Moreover, although the UI panel 20 is described as an example in the above respective exemplary embodiments, the present invention is not limited to the same. For example, the means for inputting may be a mouse or a keyboard or the like that is connected to a personal computer, or may be any structure provided that it is an input device by which a user can input instructions to the temperature detecting device 10 (10A).

Still further, the above respective exemplary embodiments describe examples of cases using the voltage divider resistors 32A, 32B, 32C, but the present invention is not limited to the same, and the voltage divider resistors may be used singly. In this case, for example, by making each of plural voltage divider resistors, that have different electrical resistance values, be able to be connected in series so as to be freely inserted and removed between the thermistor and the NMOS transistors 40, temperature detection in various sectional detection regions is possible in the same way as in the above respective exemplary embodiments.

Moreover, although an NTC thermistor is used as the thermistor 28 (28A) in the above respective exemplary embodiments, the present invention is not limited to the same, and another thermistor such as a PTC thermistor, a CTR thermistor, or the like may be used.

Further, the above respective exemplary embodiments describe examples of cases in which field effect transistors are used in the temperature detecting device 10 (10A) as the switching elements that supply electricity to the thermistor and the voltage divider resistors, but the present invention is not limited to the same, and bipolar transistors may be used. In this case, bipolar transistors may be assembled into the temperature detecting device 10 (10A) instead of field effect transistors, such that the collector terminals of the bipolar transistors correspond to the drains of the field effect transistors, the emitter terminals of the bipolar transistors correspond to the source terminals of the field effect transistors, and the base terminals of the bipolar transistors correspond to the gate terminals of the field effect transistors.

Still further, although the above respective exemplary embodiments describe examples in which the present invention is applied to the temperature detecting device 10 (10A), the present invention is not limited to the same. The present invention can be applied to any structure provided that it is a structure that detects a physical amount by using a resistance element whose electrical resistance value varies in accordance with changes in a specific physical amount, such as, for example, a strain gauge or a piezoelectric sensor that detects strain of a physical object using piezo resistance, or the like.

In accordance with a first aspect of the present invention a detecting device including: a detecting element to one end of which a first constant voltage is applied, and an electrical resistance value of which varies in accordance with changes in a physical amount serving as an object of detection; a resistance element having one end connected to another end of the detecting element; a switching element having a first terminal connected to another end of the resistance element, a second terminal controlled to a second constant voltage that is a lower voltage than the first constant voltage, and a control terminal that, when a voltage that is greater than or equal to a predetermined magnitude is applied, sets the first terminal and the second terminal, which are typically in a non-conducting state, in a conducting state; a control unit which, in accordance with a conducting/non-conducting state between the first terminal and the second terminal, controls a voltage applied to the control terminal such that a potential difference between the one end of the detecting element and the other end of the resistance element is maintained at a predetermined potential difference; and an AD converter that converts, into a digital value, a potential obtained by a potential difference between the first constant voltage and the first terminal being voltage-divided at the detecting element and the resistance element that is connected to the other end of the detecting element, and at which a first reference potential is the first constant voltage and a second reference potential is a voltage applied to the first terminal.

In the detecting device of the first aspect, a first constant voltage is applied to one end of the detecting element whose electrical resistance value varies in accordance with changes in a physical amount that serves as the object of detection. One end of the resistance element is connected to the other end of the detecting element. A first terminal of the switching element, that has the first terminal, a second terminal and a control terminal, is connected to the other end of the resistance element. The second terminal is controlled to a second constant voltage that is a lower voltage than the first constant voltage. When voltage that is greater than or equal to a predetermined magnitude is applied to the control terminal, the first terminal and the second terminal that are non-conducting at usual times are set in a conducting state.

In the detecting device of the first aspect, the voltage applied to the control terminal is controlled by the control unit in accordance with the conducting/non-conducting state between the first terminal and the second terminal, such that the potential difference between the one end of the detecting element and the other end of the resistance element is maintained at a predetermined potential difference. Potential, that is obtained by a potential difference between the first constant voltage and the first terminal being voltage-divided at the detecting element and the resistance element that is connected to the other end of the detecting element, is converted into a digital value by the AD converter at which the first reference potential is the first constant voltage and the second reference potential is the voltage applied to the first terminal.

Accordingly, in accordance with the detecting device of the first aspect, in accordance with the conducting/non-conducting state between the first terminal and the second terminal of the switching element, the voltage that is applied to the control terminal of the switching element is controlled such that the potential difference between the one end of the detecting element and the other end of the resistance element is maintained at a predetermined potential difference. Further, the potential, that is obtained by the potential difference between the first constant voltage and the first terminal being voltage-divided at the detecting element and the resistance element that is connected to the other end of the detecting element, is converted into a digital value by the AD converter at which the first reference potential is the first constant voltage and the second reference potential is the voltage applied to the first terminal. Due thereto, detection errors due to the electrical resistance value of the switching element can be suppressed without changing the structure of the switching element.

In accordance with a second aspect of the present invention, in the first aspect, the control unit may include a differential amplification circuit having an inverting input terminal to which is applied a third constant voltage of a voltage value that is greater than a ground potential and less than a voltage value of the first constant voltage, and a non-inverting input terminal connected to the other end of the resistance element, and an output terminal connected to the control terminal. Due thereto, the potential difference between the one end of the detecting element and the other end of the resistance element can easily be maintained at a predetermined potential difference.

In accordance with a third aspect of the present invention, there is provided a detecting device including: a detecting element to one end of which a first constant voltage is applied, and an electrical resistance value of which varies in accordance with changes in a physical amount serving as an object of detection; a plurality of resistance elements having respective one ends connected to another end of the detecting element, and that have electrical resistance values that are made to correspond in advance respectively to a plurality of sectional detection regions that are obtained by dividing a detection region of the physical amount into sections; switching elements that are provided in respective correspondence with the resistance elements, and that each include a first terminal connected to another end of the corresponding resistance element, a second terminal controlled to a second constant voltage that is a lower voltage than the first constant voltage, and a control terminal that, when a voltage that is greater than or equal to a predetermined magnitude is applied, sets the first terminal and the second terminal, which are typically in a non-conducting state, in a conducting state; a control unit which, in accordance with a conducting/non-conducting state between the first terminal and the second terminal of the switching element whose first terminal is connected to the other end of the resistance element corresponding to a predetermined sectional detection region, controls a voltage applied to the control terminal of the switching element corresponding to the resistance element such that a potential difference between the one end of the detecting element and the other end of the resistance element corresponding to the predetermined sectional detection region is maintained at a predetermined potential difference; and an AD converter that converts, into a digital value, a potential obtained by a potential difference between the first constant voltage and the first terminal being voltage-divided at the detecting element and the resistance element that is connected to the other end of the detecting element, and at which a first reference potential is the first constant voltage and a second reference potential is a voltage applied to the first terminal.

In the detecting device of the third aspect, the first constant voltage is applied to one end of the detecting element whose electrical resistance value varies in accordance with changes in a physical amount that serves as the object of detection. Respective one ends of the plural resistance elements are connected to the other end of the detecting element. The respective electrical resistance values of the resistance elements are made to correspond in advance respectively to plural sectional detection regions that are obtained by dividing the detection region of the physical amount into sections.

In the detecting device of the third aspect, a switching element having a first terminal, a second terminal and a control terminal is provided for each of the resistance elements. The respective first terminals of the switching elements are connected to the other ends of the corresponding resistance elements. The respective second terminals of the switching elements are controlled to a second constant voltage that is a lower voltage than the first constant voltage. When a voltage that is greater than or equal to a predetermined magnitude is applied to the respective control terminals of the switching elements, the first terminals and the second terminals, that are in non-conducting states at usual times, are set in conducting states.

In the detecting device of the third aspect, in accordance with the conducting/non-conducting state between the first terminal and the second terminal of the switching element whose first terminal is connected to the other end of the resistance element corresponding to a predetermined sectional detection region, the control unit controls the voltage, that is applied to the control terminal of the switching element corresponding to that resistance element, such that a potential difference between the one end of the detecting element and the other end of the resistance element corresponding to the predetermined sectional detection region is maintained at a predetermined potential difference. Further, potential, that is obtained by a potential difference between the first constant voltage and the first terminal being voltage-divided at the detecting element and the resistance element that is connected to the other end of the detecting element, is converted into a digital value by the AD converter at which the first reference potential is the first constant voltage and the second reference potential is the voltage applied to the first terminal.

Accordingly, in accordance with the detecting device of the third aspect, in accordance with the conducting/non-conducting state between the first terminal and the second terminal of the switching element whose first terminal is connected to the other end of the resistance element that corresponds to a predetermined sectional detection region, the voltage, that is applied to the control terminal of the switching element corresponding to that resistance element, is controlled such that the potential difference between the one end of the detecting element and the other end of the resistance element corresponding to the predetermined sectional detection region is maintained at a predetermined potential difference. Further, the potential, that is obtained by the potential difference between the first constant voltage and the first terminal being voltage-divided at the detecting element and the resistance element that is connected to the other end of the detecting element, is converted into a digital value by the AD converter at which the first reference potential is the first constant voltage and the second reference potential is the voltage applied to the first terminal. Due thereto, detection errors due to the electrical resistance values of the switching elements can be suppressed without changing the structures of the switching elements.

In accordance with a fourth aspect of the present invention, in the third aspect, the detecting device may further include a detection region designating unit which designates any of the sectional detection regions, and the control unit may include: a differential amplification circuit including an inverting input terminal to which is applied a third constant voltage of a voltage value that is greater than a ground potential and less than a voltage value of the first constant voltage, and a non-inverting input terminal connected to the other ends of the resistance elements, and an output terminal connected to the control terminals; first switching units that are provided in respective correspondence with the switching elements, and that each includes a second constant voltage terminal that is controlled to the second constant voltage, and that are each able to switch between a state of connecting the second constant voltage terminal and the control terminal of the corresponding switching element, and a state of connecting the output terminal and the control terminal of the corresponding switching element; and second switching units that are provided in respective correspondence with the resistance elements, and whose one ends are connected to the non-inverting input terminal and whose other ends are connected to the other ends of the corresponding resistance elements respectively, and that are each able to switch between a state of connecting the non-inverting input terminal and the other end of the corresponding resistance element, and a state of not connecting the non-inverting input terminal and the other end of the corresponding resistance element, and wherein, in accordance with a conducting/non-conducting state between the first terminal and the second terminal of the switching element whose first terminal is connected to the other end of the resistance element corresponding to the sectional detection region designated by the detection region designating unit, the control unit may control the first switching units and the second switching units such that a potential difference between the one end of the detecting element and the other end of the resistance element corresponding to the sectional detection region is maintained at a predetermined potential difference. Due thereto, the potential difference between the one end of the detecting element and the other end of the resistance element can easily be maintained at a predetermined potential difference in all of the plural sectional detection regions.

In accordance with a fifth aspect of the present invention, in the first through fourth aspects, the detecting element may include a plurality of detecting elements, and the respective detecting elements may be connected in parallel, and respective other ends of the detecting elements may be connected in series to respective one ends of a plurality of resistance elements, and the detecting device may further include a selective application unit that selectively applies the first constant voltage to respective one ends of the detecting elements. Due thereto, a physical amount can be detected by using an arbitrary detecting element among plural detecting elements.

In accordance with a sixth aspect of the present invention, in the fifth aspect, the selective application unit may include: second switching elements that are provided in respective correspondence with the detecting elements, and that each include a first terminal connected to one end of a corresponding detecting element, a second terminal controlled to a fourth constant voltage of a voltage value greater than a voltage value of the first constant voltage, and a control terminal that, when a voltage of a voltage value less than or equal to a threshold value is applied, sets the first terminal and the second terminal, which are typically in a non-conducting state, in a conducting state; and a second control unit that, in accordance with a conducting/non-conducting state between the first terminal and the second terminal of the second switching element whose first terminal is connected to one end of a predetermined detecting element, controls a voltage applied to the control terminal of the second switching element corresponding to the detecting element such that a voltage applied to the one end of the detecting element is maintained at the first constant voltage. Due thereto, the voltage that is applied to one end of a predetermined detecting element can easily be maintained at the first constant voltage.

In accordance with a seventh aspect of the present invention, in the sixth aspect, the detecting device may further include a detecting element designating unit that designates any of the detecting elements, and the second control unit may include: a second differential amplification circuit including an inverting input terminal to which the first constant voltage is applied, and a non-inverting input terminal connected to the respective one ends of the detecting elements, and an output terminal connected to the control terminals of the second switching elements; first switching units that are provided in respective correspondence with the second switching elements, and that each include a fourth constant voltage terminal that is controlled to the fourth constant voltage, and that are each able to switch between a state of connecting the fourth constant voltage terminal and the control terminal of the second switching element, and a state of connecting the output terminal of the second differential amplification circuit and the control terminal of the second switching element; and second switching units that are provided in respective correspondence with the detecting elements, and whose one ends are connected to the non-inverting input terminal of the second differential amplification circuit and whose other ends are connected to one ends of the detecting elements respectively, and that are each able to switch between a state of connecting the non-inverting input terminal of the second differential amplification circuit and the one end of the detecting element, and a state of not connecting the non-inverting input terminal of the second differential amplification circuit and the one end of the detecting element, and, in accordance with a conducting/non-conducting state between the first terminal and the second terminal of the second switching element whose first terminal is connected to the one end of the detecting element designated by the detecting element designating unit, the second control unit may control the first switching units and the second switching units such that a voltage applied to the one end of the detecting element is maintained at the first constant voltage. Due thereto, at all of the plural detecting elements, the voltage that is applied to one end can easily be maintained at the first constant voltage.

In accordance with the present invention, detection errors due to the electrical resistance value of a switching element can be suppressed without changing the structure of the switching element.

Embodiments of the present invention are described above, but the present invention is not limited to the embodiments as will be clear to those skilled in the art.

What is claimed is:
1. A detecting device comprising:
a detecting element to one end of which a first constant voltage is applied, and an electrical resistance value of which varies in accordance with changes in a physical amount serving as an object of detection;
a resistance element having one end connected to another end of the detecting element;
a switching element having a first terminal connected to another end of the resistance element, a second terminal controlled to a second constant voltage that is a lower voltage than the first constant voltage, and a control terminal that, when a voltage that is greater than or equal to a predetermined magnitude is applied, sets the first terminal and the second terminal, which are typically in a non-conducting state, in a conducting state;
a control unit which, in accordance with a conducting/non-conducting state between the first terminal and the second terminal, controls a voltage applied to the control terminal such that a potential difference between the one end of the detecting element and the other end of the resistance element is maintained at a predetermined potential difference; and
an AD converter that converts, into a digital value, a potential obtained by a potential difference between the first constant voltage and the first terminal being voltage-divided at the detecting element and the resistance element that is connected to the other end of the detecting element, and at which a first reference potential is the first constant voltage and a second reference potential is a voltage applied to the first terminal.

2. The detecting device of claim 1, wherein the control unit comprises a differential amplification circuit having an inverting input terminal to which is applied a third constant voltage of a voltage value that is greater than a ground potential and less than a voltage value of the first constant voltage, and a non-inverting input terminal connected to the other end of the resistance element, and an output terminal connected to the control terminal.

3. The detecting device of claim 1, wherein
the detecting element comprises a plurality of detecting elements, and the respective detecting elements are connected in parallel, and respective other ends of the detecting elements are connected in series to respective one ends of a plurality of resistance elements, and
the detecting device further comprises a selective application unit that selectively applies the first constant voltage to respective one ends of the detecting elements.

4. The detecting device of claim 3, wherein the selective application unit comprises:
second switching elements that are provided in respective correspondence with the detecting elements, and that each comprise a first terminal connected to one end of a corresponding detecting element, a second terminal controlled to a fourth constant voltage of a voltage value greater than a voltage value of the first constant voltage, and a control terminal that, when a voltage of a voltage value less than or equal to a threshold value is applied, sets the first terminal and the second terminal, which are typically in a non-conducting state, in a conducting state; and
a second control unit that, in accordance with a conducting/non-conducting state between the first terminal and the second terminal of the second switching element whose first terminal is connected to one end of a predetermined detecting element, controls a voltage applied to the control terminal of the second switching element corresponding to the detecting element such that a voltage applied to the one end of the detecting element is maintained at the first constant voltage.

5. The detecting device of claim 4, further comprising a detecting element designating unit that designates any of the detecting elements, wherein
the second control unit comprises:
a second differential amplification circuit comprising an inverting input terminal to which the first constant voltage is applied, and a non-inverting input terminal connected to the respective one ends of the detecting elements, and an output terminal connected to the control terminals of the second switching elements;
first switching units that are provided in respective correspondence with the second switching elements, and that each comprise a fourth constant voltage terminal that is controlled to the fourth constant voltage, and that are each able to switch between a state of connecting the fourth constant voltage terminal and the control terminal of the second switching element, and a state of connecting the output terminal of the second differential amplification circuit and the control terminal of the second switching element; and
second switching units that are provided in respective correspondence with the detecting elements, and whose one ends are connected to the non-inverting input terminal of the second differential amplification circuit and whose other ends are connected to one ends of the detecting elements respectively, and that are each able to switch between a state of connecting the non-inverting input terminal of the second differential amplification circuit and the one end of the detecting element, and a state of not connecting the non-inverting input terminal of the second differential amplification circuit and the one end of the detecting element, and
wherein, in accordance with a conducting/non-conducting state between the first terminal and the second terminal of the second switching element whose first terminal is connected to the one end of the detecting element designated by the detecting element designating unit, the second control unit controls the first switching units and the second switching units such that a voltage applied to the one end of the detecting element is maintained at the first constant voltage.

6. A detecting device comprising:
a detecting element to one end of which a first constant voltage is applied, and an electrical resistance value of which varies in accordance with changes in a physical amount serving as an object of detection;
a plurality of resistance elements having respective one ends connected to another end of the detecting element, and that have electrical resistance values that are made to correspond in advance respectively to a plurality of sectional detection regions that are obtained by dividing a detection region of the physical amount into sections;
switching elements that are provided in respective correspondence with the resistance elements, and that each comprise a first terminal connected to another end of the corresponding resistance element, a second terminal controlled to a second constant voltage that is a lower voltage than the first constant voltage, and a control terminal that, when a voltage that is greater than or equal to a predetermined magnitude is applied, sets the first terminal and the second terminal, which are typically in a non-conducting state, in a conducting state;
a control unit which, in accordance with a conducting/non-conducting state between the first terminal and the second terminal of the switching element whose first terminal is connected to the other end of the resistance element corresponding to a predetermined sectional detection region, controls a voltage applied to the control terminal of the switching element corresponding to the resistance element such that a potential difference between the one end of the detecting element and the other end of the resistance element corresponding to the predetermined sectional detection region is maintained at a predetermined potential difference; and
an AD converter that converts, into a digital value, a potential obtained by a potential difference between the first constant voltage and the first terminal being voltage-divided at the detecting element and the resistance element that is connected to the other end of the detecting element, and at which a first reference potential is the first constant voltage and a second reference potential is a voltage applied to the first terminal.

7. The detecting device of claim 6, further comprising a detection region designating unit which designates any of the sectional detection regions, wherein
the control unit comprises:
a differential amplification circuit comprising an inverting input terminal to which is applied a third constant voltage of a voltage value that is greater than a ground potential and less than a voltage value of the first constant voltage, and a non-inverting input terminal connected to the other ends of the resistance elements, and an output terminal connected to the control terminals;

first switching units that are provided in respective correspondence with the switching elements, and that each comprise a second constant voltage terminal that is controlled to the second constant voltage, and that are each able to switch between a state of connecting the second constant voltage terminal and the control terminal of the corresponding switching element, and a state of connecting the output terminal and the control terminal of the corresponding switching element; and second switching units that are provided in respective correspondence with the resistance elements, and whose one ends are connected to the non-inverting input terminal and whose other ends are connected to the other ends of the corresponding resistance elements respectively, and that are each able to switch between a state of connecting the non-inverting input terminal and the other end of the corresponding resistance element, and a state of not connecting the non-inverting input terminal and the other end of the corresponding resistance element, and wherein, in accordance with a conducting/non-conducting state between the first terminal and the second terminal of the switching element whose first terminal is connected to the other end of the resistance element corresponding to the sectional detection region designated by the detection region designating unit, the control unit controls the first switching units and the second switching units such that a potential difference between the one end of the detecting element and the other end of the resistance element corresponding to the sectional detection region is maintained at a predetermined potential difference.

8. The detecting device of claim 6, wherein the detecting element comprises a plurality of detecting elements, and the respective detecting elements are connected in parallel, and respective other ends of the detecting elements are connected in series to respective one ends of a plurality of the resistance elements, and the detecting device further comprises a selective application unit which selectively applies the first constant voltage to respective one ends of the detecting elements.

9. The detecting device of claim 8, wherein the selective application unit comprises:

second switching elements that are provided in respective correspondence with the detecting elements, and that each comprise a first terminal connected to one end of a corresponding detecting element, a second terminal controlled to a fourth constant voltage of a voltage value greater than a voltage value of the first constant voltage, and a control terminal that, when a voltage of a voltage value less than or equal to a threshold value is applied, sets the first terminal and the second terminal, which are typically in a non-conducting state, in a conducting state; and a second control unit that, in accordance with a conducting/non-conducting state between the first terminal and the second terminal of the second switching element whose first terminal is connected to one end of a predetermined detecting element, controls, a voltage applied to the control terminal of the second switching element corresponding to the detecting element such that a voltage applied to the one end of the detecting element is maintained at the first constant voltage.

10. The detecting device of claim 9, further comprising a detecting element designating unit for designating any of the detecting elements, wherein the second control unit comprises:

a second differential amplification circuit comprising an inverting input terminal to which the first constant voltage is applied, and a non-inverting input terminal connected to the respective one ends of the detecting elements, and an output terminal connected to the control terminals of the second switching elements;

third switching units that are provided in respective correspondence with the second switching elements, and that each comprise a fourth constant voltage terminal that is controlled to the fourth constant voltage, and that are each able to switch between a state of connecting the fourth constant voltage terminal and the control terminal of the second switching element, and a state of connecting the output terminal of the second differential amplification circuit and the control terminal of the second switching element; and fourth switching units that are provided in respective correspondence with the detecting elements, and whose one ends are connected to the non-inverting input terminal of the second differential amplification circuit and whose other ends are connected to one ends of the detecting elements respectively, and that are each able to switch between a state of connecting the non-inverting input terminal of the second differential amplification circuit and the one end of the detecting element, and a state of not connecting the non-inverting input terminal of the second differential amplification circuit and the one end of the detecting element, and wherein, in accordance with a conducting/non-conducting state between the first terminal and the second terminal of the second switching element whose first terminal is connected to the one end of the detecting element designated by the detecting element designating unit, the second control unit controls the third switching units and the fourth switching units such that a voltage applied to the one end of the detecting element is maintained at the first constant voltage.

* * * * *